United States Patent
Gadgil et al.

(10) Patent No.: US 11,288,781 B2
(45) Date of Patent: Mar. 29, 2022

(54) EFFICIENT END-TO-END SINGLE LAYER INVERSE DISPLAY MANAGEMENT CODING

(71) Applicant: Dolby Laboratories Licensing Corporation, San Francisco, CA (US)

(72) Inventors: Neeraj J. Gadgil, Sunnyvale, CA (US); Guan-Ming Su, Fremont, CA (US); Tao Chen, Palo Alto, CA (US); Yoon Yung Lee, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 276 days.

(21) Appl. No.: 16/623,326

(22) PCT Filed: Jun. 13, 2018

(86) PCT No.: PCT/US2018/037313
§ 371 (c)(1),
(2) Date: Dec. 16, 2019

(87) PCT Pub. No.: WO2018/231968
PCT Pub. Date: Dec. 20, 2018

(65) Prior Publication Data
US 2021/0150680 A1 May 20, 2021

Related U.S. Application Data

(60) Provisional application No. 62/520,832, filed on Jun. 16, 2017.

(30) Foreign Application Priority Data

Jun. 16, 2017 (EP) .................................... 17176416

(51) Int. Cl.
*G06T 5/00* (2006.01)
*H04N 19/186* (2014.01)
(Continued)

(52) U.S. Cl.
CPC .............. *G06T 5/009* (2013.01); *G06T 5/40* (2013.01); *H04N 19/186* (2014.11); *H04N 19/98* (2014.11); *G06T 2207/20208* (2013.01)

(58) Field of Classification Search
CPC ..................... G06T 5/009; G06T 2207/20208
See application file for complete search history.

(56) References Cited

U.S. PATENT DOCUMENTS 8,811,490 B2    8/2014  Su
9,264,681 B2    2/2016  Gish
(Continued)

FOREIGN PATENT DOCUMENTS

EP      3131284         2/2017
JP      2010231756      10/2010
(Continued)

OTHER PUBLICATIONS

Ebner, Fritz "Development and Testing of a Color Space (IPT) with Improved Hue Uniformity" The Sixth Color Imaging Conference: Color Science, Systems, and Applications, IS&T, Scottsdale, AZ, Nov. 1998, pp. 8-13.

(Continued)

*Primary Examiner* — Phi Hoang

(57) ABSTRACT

A standard dynamic range (SDR) image is received. Composer metadata is generated for mapping the SDR image to an enhanced dynamic range (EDR) image. The composer metadata specifies a backward reshaping mapping that is generated from SDR-EDR image pairs in a training database. The SDR-EDR image pairs comprise SDR images that do not include the SDR image and EDR images that corresponds to the SDR images. The SDR image and the composer metadata are encoded in an output SDR video signal. An EDR display operating with a receiver of the output SDR video signal is caused to render an EDR display image. The EDR display image is derived from a composed EDR image (Continued)

composed from the SDR image based on the composer metadata.

11 Claims, 17 Drawing Sheets

(51) Int. Cl.
*H04N 19/98* (2014.01)
*G06T 5/40* (2006.01)

(56) References Cited

U.S. PATENT DOCUMENTS

| | | | |
|---|---|---|---|
| 9,497,456 | B2 | 11/2016 | Su |
| 9,584,811 | B2 | 2/2017 | Su |
| 9,628,808 | B2 | 4/2017 | Su |
| 9,936,199 | B2 | 4/2018 | Froehlich |
| 10,080,026 | B2 | 9/2018 | Su |
| 10,298,923 | B2 | 5/2019 | Su |
| 2008/0175496 | A1* | 7/2008 | Segall ............ G06T 5/009 382/238 |
| 2010/0246940 | A1 | 9/2010 | Lin |
| 2012/0170842 | A1* | 7/2012 | Liu ............ G06T 5/007 382/167 |
| 2013/0108183 | A1 | 5/2013 | Bruls |
| 2014/0210847 | A1* | 7/2014 | Knibbeler ............ G06T 5/50 345/589 |
| 2015/0156469 | A1 | 6/2015 | Qu |
| 2015/0245044 | A1* | 8/2015 | Guo ............ H04N 21/42202 375/240.03 |
| 2017/0078706 | A1* | 3/2017 | Van Der Vleuten ... H04N 19/46 |
| 2017/0180734 | A1 | 6/2017 | Su |
| 2017/0330312 | A1* | 11/2017 | Nam ............ G06T 5/009 |
| 2018/0005357 | A1* | 1/2018 | Lasserre ............ H04N 5/57 |
| 2018/0232867 | A1* | 8/2018 | Park ............ H04N 5/235 |
| 2018/0234704 | A1 | 8/2018 | Atkins |
| 2019/0156467 | A1* | 5/2019 | Lasserre ............ G06T 5/009 |

FOREIGN PATENT DOCUMENTS

| | | |
|---|---|---|
| JP | 2013539610 | 10/2013 |
| JP | 2014519221 | 8/2014 |
| JP | 2017033534 | 2/2017 |
| JP | 2017509057 | 3/2017 |
| JP | 2017509238 | 3/2017 |
| WO | 2013086169 A1 | 6/2013 |
| WO | 2014130343 A2 | 8/2014 |
| WO | 2017165494 A2 | 9/2017 |
| WO | 2018119161 A1 | 6/2018 |

OTHER PUBLICATIONS

ITU-R BT. 2100 "Image Parameter Values for High Dynamic Range Television for Use in Production and International Programme Exchange" ITU, Jul. 2016.
ITU-R BT.1886 "Reference Electro-Optical Transfer Function for Flat Panel Displays Used in HDTV Studio Production" p. 1-7.
SMPTE ST 2084:2014 "High Dynamic Range Electro-Optical Transfer Function of Mastering Reference Displays".
SMPTE ST 2094-10:2016 "Dynamic Metadata for Color Volume Transform—Application #1", pp. 1-15.

* cited by examiner

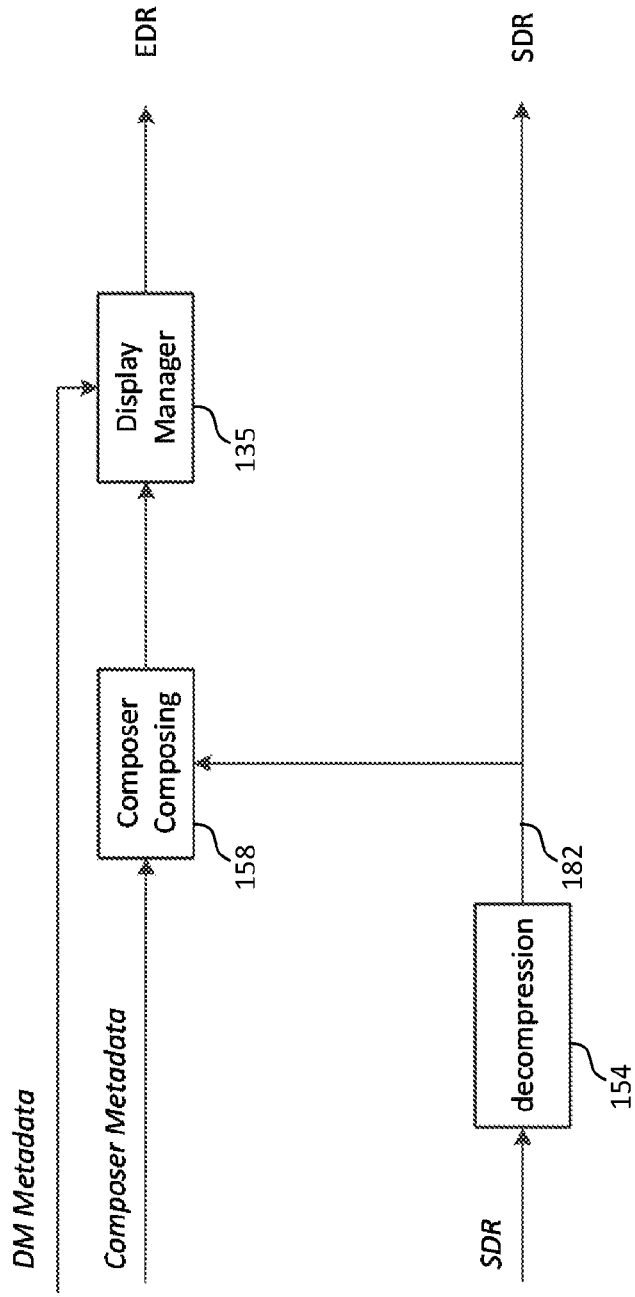

EFFICIENT END-TO-END SINGLE LAYER INVERSE DISPLAY MANAGEMENT CODING

CROSS-REFERENCE TO RELATED APPLICATIONS

This application is the U.S. National Stage of International Patent Application No. PCT/US2018/037313, filed Jun. 13, 2018, which claims the benefit of priority from U.S. Provisional Patent Application No. 62/520,832, filed Jun. 16, 2017, and European Patent Application No. 17176416.0, filed Jun. 16, 2017, each of which is incorporated herein by reference.

TECHNOLOGY

The present invention relates generally to images. More particularly, an embodiment of the present invention relates to efficient end-to-end single layer inverse display management (DM) coding.

BACKGROUND

As used herein, the term "dynamic range" (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using linear luminance coding, images where $n \leq 8$ (e.g., color 24-bit JPEG images) are considered images of standard dynamic range, while images where $n>8$ may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF is typically embedded in the bitstream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Displays that support luminance of 200 to 1,000 $cd/m^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays" (hereinafter "SMPTE"), which is incorporated herein by reference in its entirety. As appreciated by the inventors here, improved techniques for encoding and decoding video data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1B through FIG. 1E and FIG. 1G illustrate example single-layer inverse display management codec architecture(s);

DESCRIPTION OF EXAMPLE EMBODIMENTS

Efficient end-to-end single layer inverse display management (DM) coding is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding single-layer video data with composer metadata. An SDR image is received. Composer metadata is generated for mapping the SDR image to an EDR image. The composer metadata specifies a backward reshaping mapping that is generated from a plurality of SDR-EDR image pairs in a training database. The plurality of SDR-EDR image pairs comprises a plurality of SDR images that do not include the SDR image and a plurality of EDR images that corresponds to the plurality of SDR images. The SDR image and the composer metadata are encoded in an output SDR video signal. An EDR display operating with a receiver of the output SDR video signal is caused to render an EDR display image. The EDR display image is derived from a composed EDR image composed from the SDR image based on the composer metadata.

Example embodiments described herein relate to decoding single-layer video data with composer metadata. An SDR video signal that is encoded with an SDR image and composer metadata is received. The composer metadata is used to map the SDR image to a composed EDR image. The composer metadata specifies a backward reshaping mapping that was generated by a video encoder from a plurality of SDR-EDR image pairs in a training database. The plurality of SDR-EDR image pairs comprises a plurality of SDR images that do not include the SDR image and a plurality of EDR images that corresponds to the plurality of SDR images. An EDR display operating with a receiver of the SDR video signal is caused to render an EDR display image. The EDR display image is derived from the composed EDR image composed from the SDR image based on the composer metadata.

Example Video Delivery Processing Pipeline

Figure 1A:
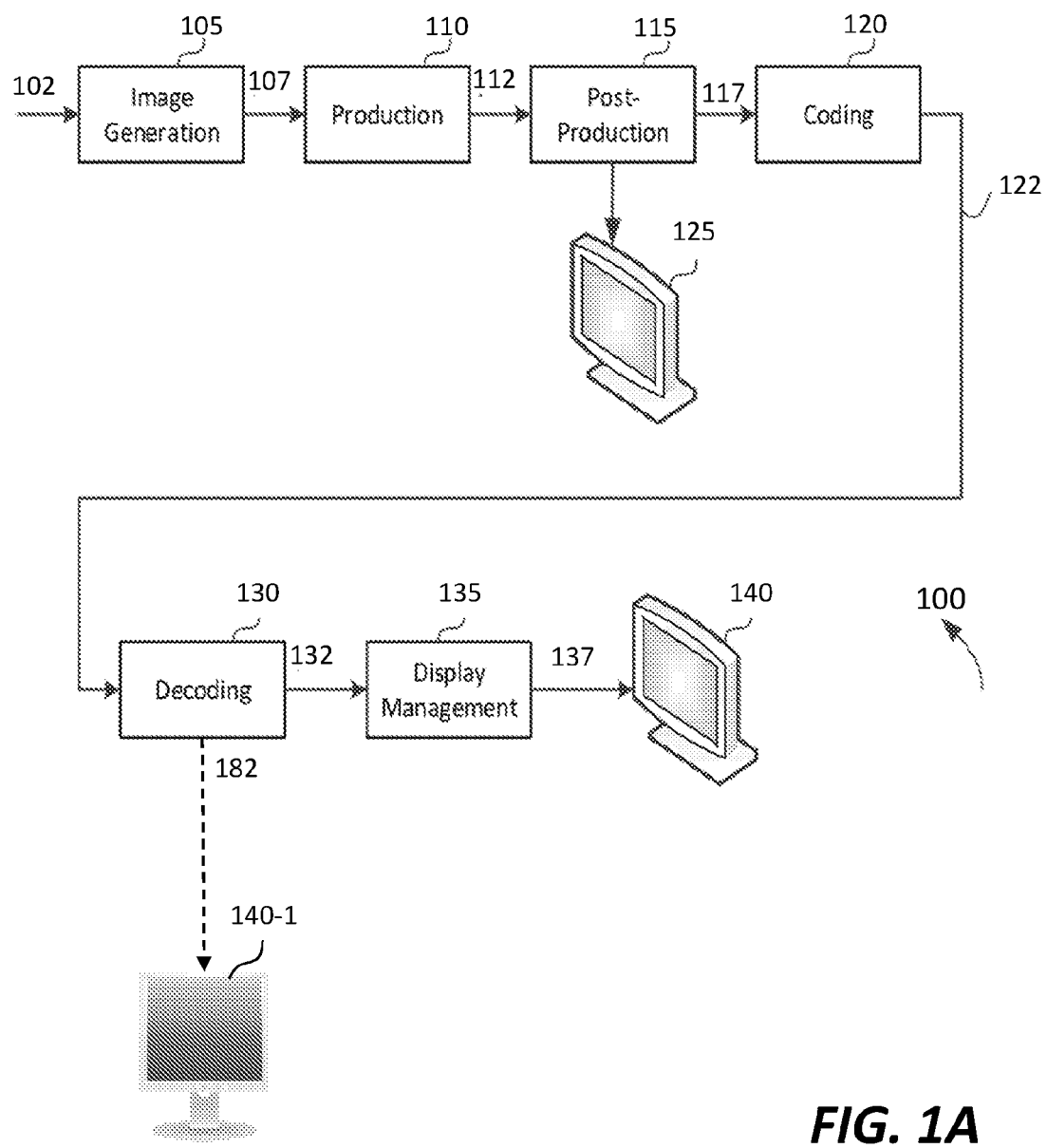
FIG. 1A depicts an example process of a video delivery pipeline.

FIG. 1A depicts an example process of a video delivery pipeline (100) showing various stages from video capture to video content display. It should be noted that techniques as described herein can be operated with a variety of SDR content generation methods including but not limited to the SDR content generation methods mentioned in FIG. 1A. In some embodiments, SDR content as described herein may be generated without any professional studio editing or color grading with artistic intent as illustrated with FIG. 1A. Thus, some or all of the techniques as described herein can operate with a (e.g., simple, etc.) SDR bitstream as input, regardless of whether SDR images in the bitstream have been color graded or non-color graded. As illustrated in FIG. 1A, a sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor for post-production editing (115). Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at post-production editing (115) to yield a release version of SDR (or relatively narrow dynamic range) images (117) (e.g., SDR, etc.). During post-production editing (115), the SDR images (117) are viewed on a reference display (125) that supports the standard dynamic range (or a relatively narrow dynamic range) by a colorist who is performing post-production editing operations on the SDR images (117).

Following post-production editing (115), the SDR images (117) are delivered to coding block (120), for example in an (e.g., input, etc.) SDR YCbCr video signal (e.g., an 8-bit video signal, etc.).

Coding block (120) generates image metadata including but not limited to composer metadata and DM metadata for the SDR images (117), and includes the image metadata along with the SDR images (117) in a coded bitstream (122). In some embodiments, coding block (120) may include audio and video encoders, such as those defined by ATSC, DVB, DVD, Blu-Ray, and other delivery formats, to generate the coded bitstream (122).

The coded bitstream (122) is to be delivered downstream to decoding and playback devices such as television sets, set-top boxes, movie theaters, and the like. In some embodiments, the coded bitstream (122) is encoded with the SDR images (117) that preserve the artistic intent with which the SDR images (117) are generated in the post-production editing (115).

The SDR images (117) can be encoded into video data in a video signal (e.g., an 8-bit SDR video signal, a 10-bit SDR video signal, etc.) that may be backward compatible with a wide variety of SDR display devices (e.g., SDR displays, etc.). In a non-limiting example, the video signal encoded with the SDR images (117) may be a single-layer backward compatible video signal.

The composer metadata extractable from the coded bitstream (122) can be used by downstream decoders to perform composition/prediction operations on the SDR images (117) to generate EDR images optimized for rendering on EDR display devices.

In some embodiments, the coded bitstream (122) is a video signal in compliance with the same video signal format as the input SDR YCbCr video signal received by coding block (120). For example, in cases where the input SDR YCbCr video signal received by the coding block (120) is an 8-bit SDR YCbCr video signal, the coded bitstream (122) outputted by coding block (120) may represent an output 8-bit SDR YCbCr video signal with the composer metadata and the DM metadata generated by coding block (120).

In some embodiments, the coded bitstream (122) is a video signal in compliance with a different video signal format from that of the input SDR YCbCr video signal received by coding block (120). For example, the input SDR YCbCr video signal received by the coding block (120) may represent an 8-bit SDR YCbCr video signal. In contrast, the coded bitstream (122) outputted by coding block (120) may represent an output 10-bit SDR YCbCr video signal, which may be derived in part from a bit-depth scaling operation performed on image data in the 8-bit SDR YCbCr video signal.

Figure 1B:
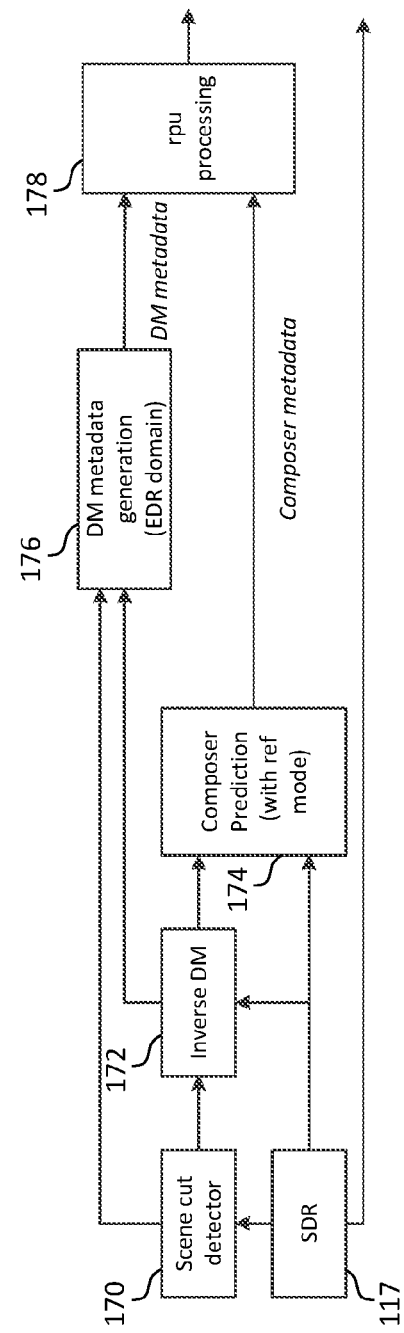
Figure 1C:
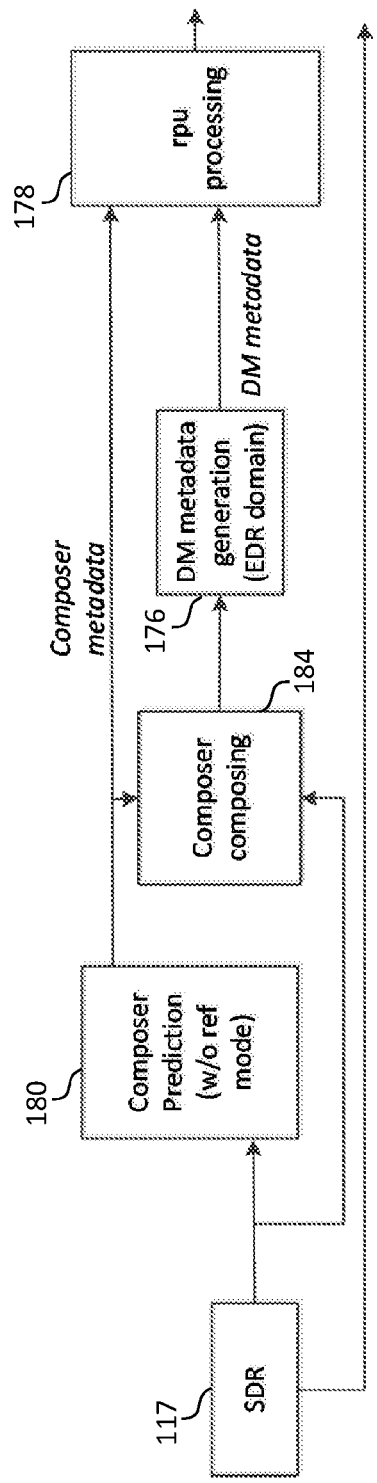
Figure 1D:
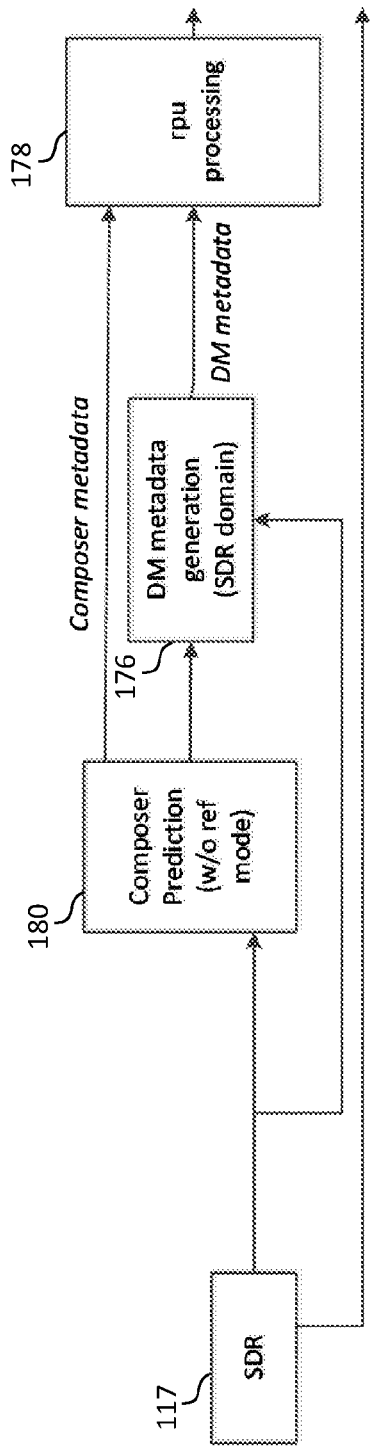
Figure 1F:
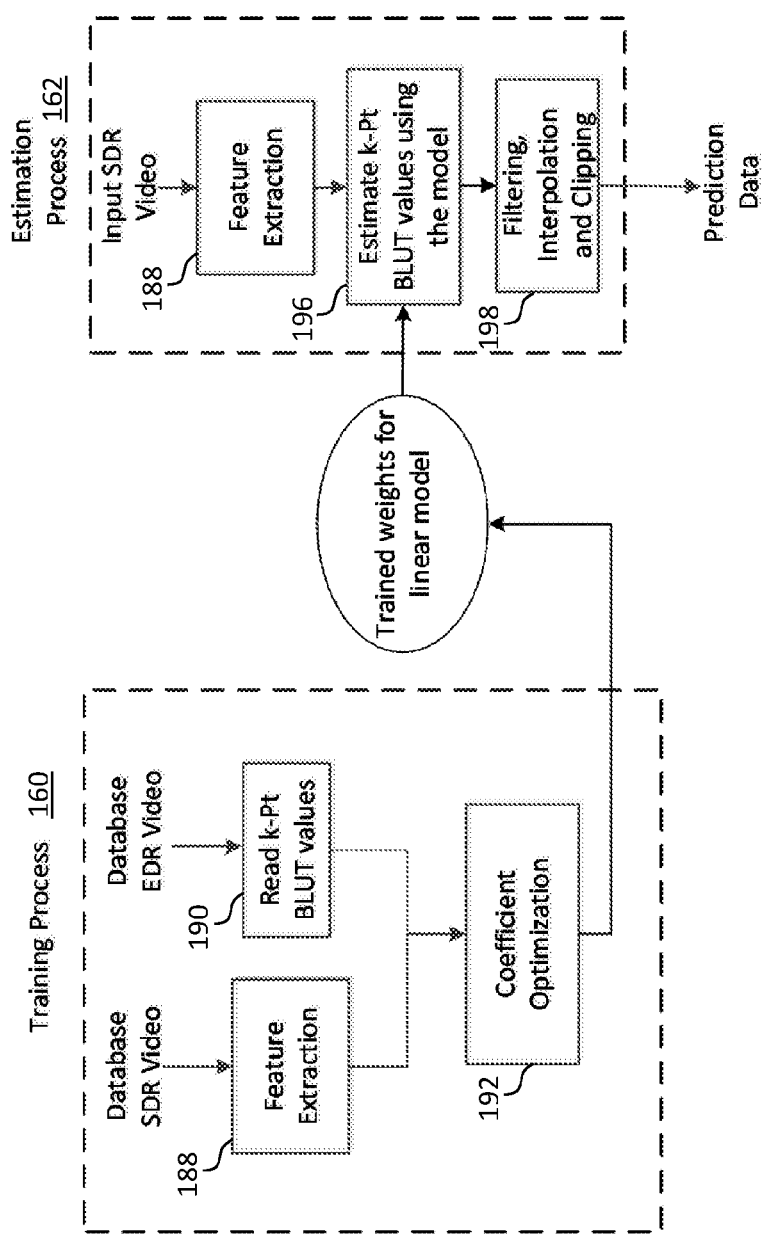
FIG. 1F illustrates an example machine learning (ML) based process.
Figure 1G:
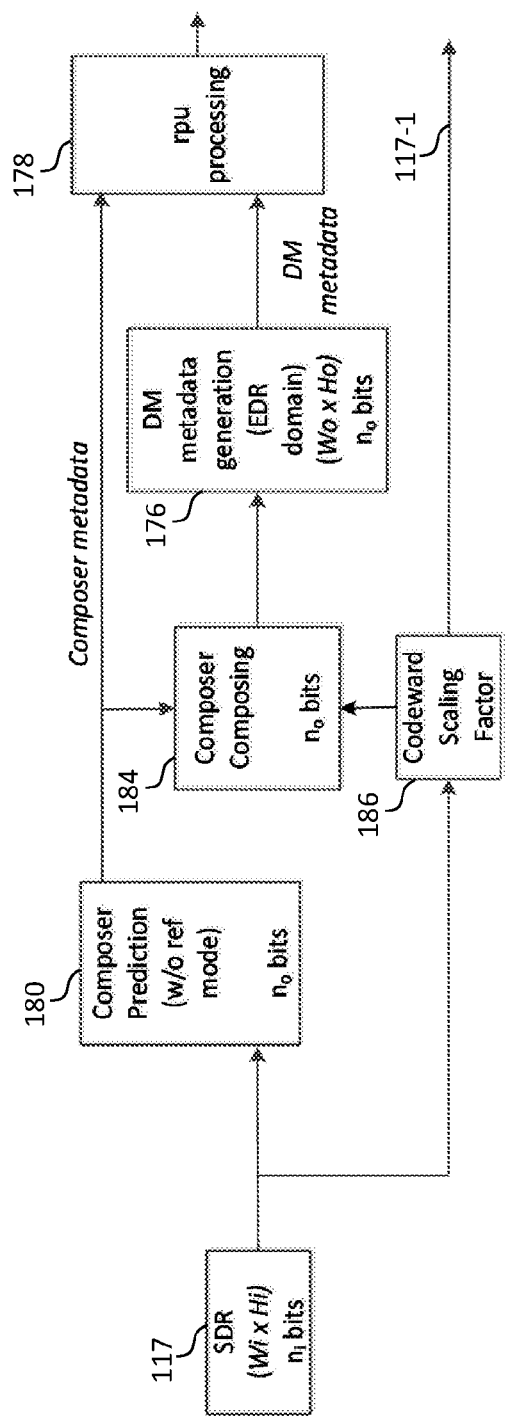

In a receiver (or a downstream device), the coded bitstream (122) is decoded by decoding block (130) to generate decoded images 182, which may be the same as the SDR images (117) (possibly with a bit-depth-dependent codeword scaling factor as illustrated in FIG. 1G), subject to quantization errors generated in compression performed by the coding block (120) and decompression performed by the decoding block (130). In some embodiments, the receiver may be attached to a first target display (140-1). In scenarios in which the first target display (140-1) supports the standard dynamic range (or the relatively narrow dynamic range) of the reference display (125) and in which the SDR images (117) has been edited with the artistic content as represented in the decoded images (182), the decoded images (182) derived from the SDR images (117) are directly watchable on a first target display (140-1).

In some embodiments, the receiver may be attached to a second target display (140), which supports a dynamic range (e.g., EDR, etc.) higher than the dynamic range (e.g., SDR, etc.) represented in the decoded SDR images (182). In that case, the decoding block (130) may perform composition/prediction operations, based on the composer metadata along with the decoded SDR images (182), on the SDR images (117) (or the decoded SDR images (182) possibly along with the bit-depth-dependent codeword scaling factor as illustrated in FIG. 1G) into EDR images (132). Additionally, optionally, or alternatively, a display management block (135)—which may be a part of the receiver, may be separately operating in conjunction with the receiver, may be a part of the target display (140), etc.—further adjusts the EDR images (132) to characteristics of the second target display (140) by generating display-mapped signal (137) adapted to the characteristics of the second target display (140).

For example, the composer metadata in the coded bitstream (122) can be used by the receiver operating with the second target display (140) to compose or predict reference EDR images (e.g., EDR YCbCr images, etc.) for a reference EDR display (e.g., a 4000-nit reference display, etc.) from the SDR images (117) (or the decoded SDR images (182) possibly with the bit-depth-dependent codeword scaling factor as illustrated in FIG. 1G). The reference EDR images as composed/predicated for the reference EDR display may be optimized in a composition color space (e.g., YCbCr, etc.).

In cases where the composition color space differs from a DM color space (e.g., an RGB color space, an ICtCp color space, an LMS color space, etc.) in which DM operations are to be performed, the receiver converts the reference EDR images in the composition color space (e.g., YCbCr, etc.) to the DM color space (e.g., RGB, ICtCp, LMS, etc.).

The DM metadata can be extracted from the coded bitstream (122) and used by the display management block (135) of the receiver to perform DM operations on the reference EDR images in the DM color space (e.g., RGB, ICtCp, LMS, etc.) to generate target display images for the second target display (140) (e.g., a 2000-nit target display, a 3000-nit target display, etc.) in the DM color space.

In cases where the DM color space differs from a display color space (e.g., RGB, etc.) in which the target display images are to be rendered, the display management block (135) further converts the target display images from the DM color space to the display color space and renders the target display images in the display color space on second target display (140).

Delivery of EDR Content and Backward Compatible SDR Content

In the past several decades, a great number of videos/movies have been created, stored, and/or published in the world. Almost all of these videos/movies are SDR content.

One example of the SDR content may be, but is not necessarily limited to only, the SDR images (117) that are derived from the video data of production stream (112) of FIG. 1A, etc.

Under other approaches, EDR content is delivered to downstream devices as compressed or uncompressed EDR video data.

In contrast, under techniques as described herein described herein, production-quality or near-production-quality EDR content that corresponds to the SDR content does not have to be compressed/encoded and sent as EDR coded video data to downstream decoding devices. Instead, upstream encoding devices can generate composer metadata relatively fast at low computational costs, without actually compressing/encoding EDR images and without delivering the compressed EDR images to downstream decoding devices. The composer metadata and DM metadata generated by the upstream encoding devices can be sent with the SDR content to the downstream decoding devices in a video signal such as the coded bitstream (122), etc. The composer metadata in the video signal enables the downstream decoding devices to reconstruct the production-quality or near-production-quality EDR content from the SDR content in the same video signal. The DM metadata in the video signal further enables the downstream decoding devices to map the production-quality or near-production-quality EDR content to a specific target displays with which the downstream decoding devices operate.

Furthermore, since the SDR content in the video signal can comprise the SDR images (e.g., 117, etc.) that are specifically optimized for SDR display devices, production-quality or near-production quality SDR content can be delivered to a wide variety of downstream decoding devices, such as those devices that only support SDR rendering, at the same time.

Codec Architecture(s)

FIG. 1B illustrates an example encoder architecture implemented by a video encoder operating in a reference mode. In the reference mode, EDR image content serves as a reference for prediction-related operations. As shown, a scene cut detector 170 performs scene cut detection to determine scene cut information related to the SDR images (117). The scene cut detector (170) feeds the scene cut information to an inverse DM module 172, which may represent a SDR-to-EDR conversion tool (e.g., an inverse tone-mapping tool, etc.). The inverse DM module (172) applies inverse DM operations to the SDR images (117) to generate inverse DM images (e.g., reference EDR images, etc.). Both the SDR images (117) and the inverse DM images are provided to a composer prediction module 174 to generate composer metadata such as composer prediction coefficients that can be used together with the SDR images (117) to generate predicted EDR images from the SDR images (117). The prediction coefficients can be generated using the inverse DM images generated by the inverse DM module (172) as a reference (or a prediction target).

A DM metadata generator 176 generates DM metadata (e.g., in EDR domain, etc.) from the inverse DM images generated by the inverse DM module (172). A reference process unit (RPU) 178 embeds the DM metadata and the composer metadata comprising the composer prediction coefficients in (e.g., metadata fields of, metadata containers of, etc.) the coded bitstream (122) with the SDR images (117). The coded bitstream (122) can be delivered to a receiver operating with an SDR display or an EDR display.

Techniques as described herein can be used to provide improvements to speed up performance throughout in the entire encoding and decoding pipeline.

FIG. 1C illustrates an efficient encoder-side codec architecture, which may be implemented with one or more computing processors in an upstream video encoder (e.g., coding block (120) of FIG. 1A, etc.).

Instead of using inverse DM operations to generate reference EDR images for prediction operations in a reference mode as illustrated in FIG. 1B, non-reference mode prediction techniques are used. Composer metadata may include static prediction coefficients or dynamic (non-static) prediction coefficients (e.g., generated with machine learning methods, etc.). These prediction coefficients can be directly used (e.g., by coding block (120), by a composer composing module 184, by a receiver, etc.) to compose or predict some or all of EDR pixel values of EDR images from corresponding SDR pixel values of the SDR images (117).

In a non-reference mode as illustrated in FIG. 1C, the SDR images (117) are encoded and transmitted in a single layer of a video signal such as the coded bitstream (122), etc., by the upstream encoding device. The composer metadata and the DM metadata are encoded and transmitted in the video signal along with the SDR images (117).

The SDR images (117) are received and decoded from the single layer of the video signal by a downstream decoding device that implements a decoder-side codec architecture. The downstream decoding device, if operating with an EDR display device, can generate EDR images based on the SDR images (117), the composer metadata and the DM metadata.

In some embodiments, the SDR images (117) represents "backward compatible SDR images," which are specifically optimized or color graded for SDR displays. Thus, the downstream decoding device, if operating with an SDR display device, can render the SDR images (117) on the SDR display device, for example without decoding the composer metadata and/or the DM metadata. In dynamically adaptive streaming scenarios, the downstream decoding device operating with the SDR display may even avoid streaming the composer metadata and/or the DM metadata.

By way of illustration but not limitation, a composer prediction module 180 operates in the non-reference mode to determine/generate composer prediction coefficients. The prediction coefficients can be generated without using any EDR images and/or any inverse DM images (e.g., generated by the inverse DM module (172) of FIG. 1B, etc.) as a reference (or a prediction target). A receiver can receive and use these prediction coefficients generated without the reference together with the SDR images (117) to generate composed/predicted EDR images from the SDR images (117).

The prediction coefficients determined/generated by the composer prediction module (180) in the non-reference mode can be provided to the RPU (178) to be multiplexed or included in the coded bitstream (122) with the SDR images (117).

The SDR images (117) and the prediction coefficients are provided to a composer composing module 184 to compose or predict some or all of EDR pixel values of EDR images from corresponding SDR pixel values of the SDR images (117).

In some embodiments, these EDR pixel values are composed in a composition color space (e.g., YCbCr, etc.) that differs from a DM color space (e.g., RGB, ICtCp, LMS, etc.) in which the DM metadata is to be generated. For example, the composition color space may be a color space that avoid computation-intensive matrix operations, where the DM color space may be a display color space of a reference EDR display. In these embodiments, the composer composing module (184) may convert some or all of the EDR pixel values from the composition color space (e.g., YCbCr, etc.) to the DM color space (e.g., RGB, ICtCp, LMS, etc.).

The DM metadata generator (176) receives some or all of the EDR pixel values in the DM color space, and uses these EDR pixel values to estimate or compute or generate the DM metadata. The DM metadata can then be provided by the DM metadata generator (176) to the RPU (178) to be multiplexed or included in the coded bitstream (122) along with the SDR images (117) and the composer metadata.

The processing flow implemented by FIG. 1C can be further simplified. As illustrated above, the composing composer module (184) is used to obtain the EDR pixel values for DM metadata generation. In some embodiments, given that the prediction coefficients are known, SDR statistics can be computed or measured with the SDR images (117) in a SDR domain. These SDR statistics in the SDR domain can be used to estimate EDR statistics for corresponding EDR images in an EDR domain, based at least in part on the prediction coefficients.

By way of example but not limitation, as illustrated in FIG. 1D, the SDR images (117) can be directly inputted to the DM metadata generator (176), which then measures the SDR statistics and estimates the EDR statistics based at least in part on the composer metadata such as the prediction coefficients. As a result, the composing composer (184) of FIG. 1C that is used in FIG. 1C to generate EDR pixel values can be removed from the processing flow as illustrated in FIG. 1D. This further reduces computational costs and speeds up the process of composer and DM metadata generation because of avoidance of generating the EDR pixel values for DM metadata generation, with a tradeoff of accuracy of the DM metadata.

In some embodiments, the composer metadata and DM metadata are carried in the video signal as a part of overall image metadata (denoted as "rpu" data or reference processing unit data), which may be separately carried in the video signal from the single layer in which the SDR images (117) are encoded in the video signal. For example, some or all of the composer metadata and DM metadata may be encoded in a component stream or a sub-stream in the coded bitstream (122).

The composer metadata and DM metadata can be generated or pre-generated on the encoder side to take advantage of powerful computing resources and offline encoding flows (including but not limited to content adaptive multiple passes, parallel computing, look ahead operations, inverse luma mapping, inverse chroma mapping, cumulative density function (CDF) based operations, multi-channel multiple regression (MMR) based operations, etc.) available on the encoder side.

Any of the encoder-side architectures of FIG. 1B through FIG. 1D can be used to avoid directly encoding EDR images into coded/compressed EDR images in the video signal; instead, the composer metadata in the video signal can be used to enable downstream decoding devices to predict the EDR images from the SDR images (117) (which are encoded in the video signal) optimized for EDR displays.

FIG. 1E illustrates an example decoder-side codec architecture, which may be implemented with one or more computing processors in a downstream video decoder (e.g., decoding block (130) and/or display manager (135) of FIG. 1A, etc.). As illustrated, the video signal encoded with the SDR images (117), the composer metadata and the DM metadata is received as input on the decoder-side codec architecture.

A decompression block 154 (e.g., a part of the decoding block (130) of FIG. 1A, etc.) decompresses/decodes compressed video data in the single layer of the video signal into the decoded SDR images (182). The decoded SDR images (182) may be the same as the SDR images (117) (possibly with a bit-depth-dependent codeword scaling factor as illustrated in FIG. 1G), subject to quantization errors in the compression block of the upstream device and in the decompression block (154) of the downstream device. The decoded SDR images (182) may have been optimized for SDR display devices. The downstream device may output the decoded SDR images (182) in an output SDR video signal (e.g., over an HDMI interface, over a video link, etc.) to an SDR display for rendering.

In addition, a composer composing block 158 extracts the composer metadata from the input video signal, constructs backward reshaping mapping(s) such as optimal backward reshaping functions (e.g., parametrized functions, backward lookup table or BLUT, a set of polynomials, etc.) based on the composer metadata, and performs composition/prediction operations (or backward reshaping operations) on the decoded SDR images (182) based on the optimal backward reshaping functions to generate composed/predicted EDR images for a reference EDR display (e.g., a 4000-nit EDR display, etc.).

In some embodiments, the predicted EDR images represent production-quality or near-production-quality EDR images optimized for rendering on the reference display.

In some embodiments, the display manager (135) extracts the DM metadata from the input video signal and applies (e.g., device-specific, etc.) display management operations on the composed/predicted EDR images to generate (e.g., EDR, etc.) display images optimized for a target (e.g., EDR, etc.) display with which the downstream device operates.

The display images may be outputted in an output (e.g., EDR, etc.) video signal (e.g., over an HDMI interface, over a video link, etc.) to and rendered on the target (e.g., EDR, etc.) display.

Prediction in Static Non-Reference Mode

As previously noted, techniques as described herein can be used to generate composer metadata such as composer prediction coefficients without using EDR images and/or inverse DM images as a reference. These prediction coefficients can be generated or determined in a non-reference mode using a variety of methods including but not limited to static prediction, machine learning (ML) based prediction, etc.

Figure 2A:
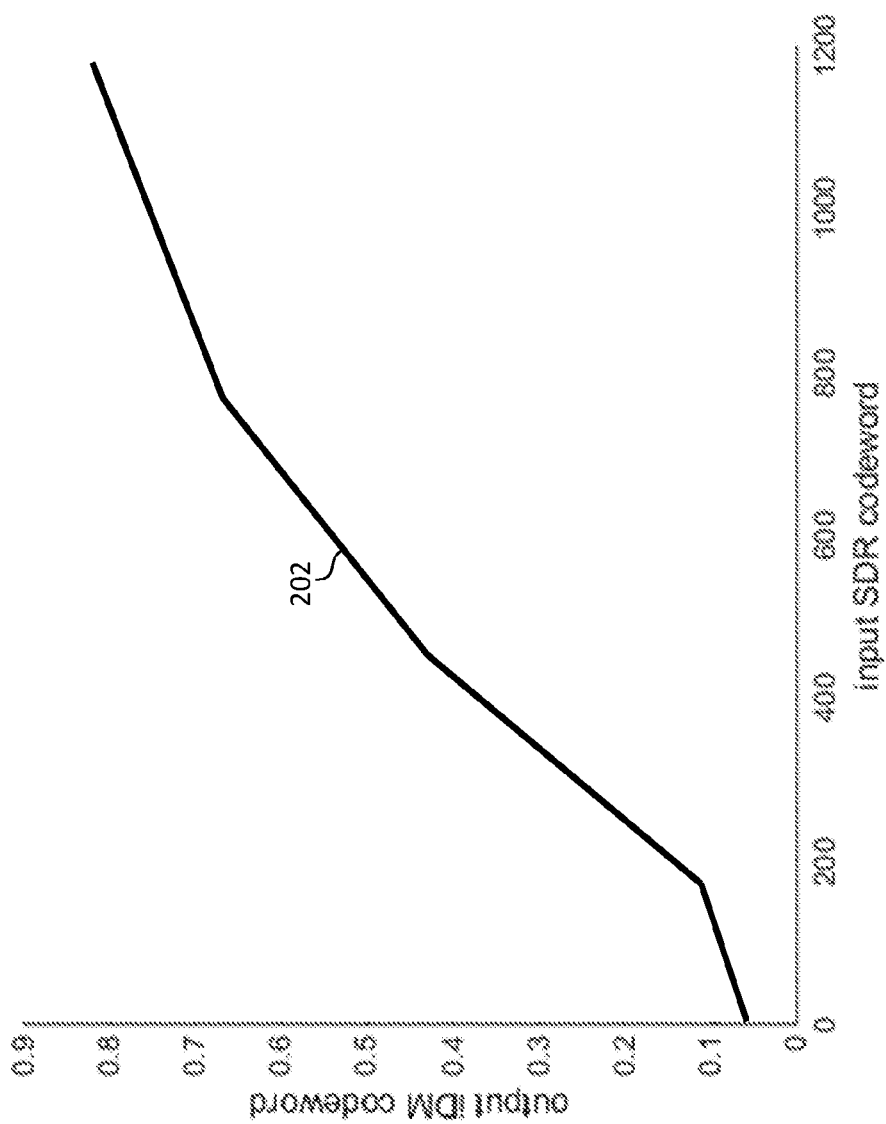
FIG. 2A through FIG. 2D illustrate example backward reshaping curves.

FIG. 2A illustrates an example (e.g., 10-bit, etc.) backward reshaping curve 202 that may be generated or determined in a static non-reference mode for composing/predicting EDR images. The backward reshaping curve (202) may be, but is not limited to only, a 10-bit backward reshaping curve that maps 100-nit Gamma R.709 luma values to 4000-nit PQ (perceptual quantization) P3 luma values.

In some embodiments, the backward reshaping curve (202) is selected (e.g., by coding block (120) of FIG. 1A, etc.) based at least in part on a peak luminance (e.g., 4000 nits, etc.) of a reference (e.g., EDR, etc.) display (e.g., a 4000-nit reference EDR display, etc.). The static non-reference mode uses fixed composer metadata—which for example defines or specifies the backward reshaping curve (202) of FIG. 2A—for predicting a corresponding EDR image for every SDR images (e.g., 117, 182, etc.). The backward reshaping curve (202) may be defined by parameters that are trained using training data (e.g., SDR-EDR image pairs) in a training database. Different backward reshaping curves may be defined for different reference (e.g., EDR, non-SDR, etc.) displays based on different color spaces associated with these reference displays and peak luminances of the reference displays. The reference backward reshaping curve (202) such as illustrated in FIG. 2A may be selected (e.g., by coding block (120) of FIG. 1A, etc.) from the different backward reshaping curves, based on a specific color space associated with the reference display for which EDR images are to be predicted and/or the peak luminance of the reference display. The selection of the backward reshaping curve (202) and the generation of composer metadata that defines/specifies the backward reshaping curve (202) may be performed (e.g., by coding block (120) of FIG. 1A, etc.) on the fly at runtime.

Prediction in Dynamic Non-Reference Mode

FIG. 1F illustrates an example machine learning (ML) based process that may be used to generate composition metadata for composing or predicting EDR images. The ML based process comprises a training process 160 (or a training phase) and an estimation process 162 (or an estimation phase). A training (e.g., video, etc.) database may be used in the training process (160) to train weights of a ML model that can be used in the estimation process (162) to generate composer prediction coefficients as described herein.

The training database may comprise a population (denoted as "Database SDR Video") of SDR images and a population (denoted as "Database EDR Video") of EDR images corresponding to the SDR images. A population of SDR-EDR image pairs may be formed by the population of the SDR images and the population of the EDR images corresponding to the SDR images. The training database can collect these SDR images and the corresponding EDR images beforehand, or on an ongoing basis while the training database is being used in the training process (160) to continuously train weights and/or while the weights is being used in the estimation process (162) to continuously generate the composer prediction coefficients.

In the training process (160), a plurality of SDR-EDR image pairs is selected from the training database. Each SDR-EDR image pair comprises an SDR image and an EDR image corresponding to the SDR image. A reference backward (e.g., luma, chroma etc.) reshaping function (or golden data) may be built for each SDR-EDR image pair in the plurality of SDR-EDR image pairs. For example, the reference backward reshaping function (or backward reshaping mapping in general) may be built using the reference mode as illustrated in FIG. 1B in which the EDR image serves as a reference (or a prediction target) for generating a predicted EDR image from the SDR image to which the EDR image corresponds. In some embodiments, cumulative density function (CDF) based matching may be used to build the reference backward luma reshaping function, as the CDF based matching provides an excellent histogram transfer method to convert or match the (e.g., visual, perceptual, etc.) looks between the SDR image and the EDR image and to ensure the backward reshaping function to be monotonically non-decreasing. Examples of CDF based matching can be found in U.S. Provisional Patent Application No. 62/404,307, filed on Oct. 5, 2016, the entire contents of which are hereby incorporated by reference as if fully set forth herein.

In block 188 of the training process (160), (e.g., image-related, etc.) features can be extracted from SDR images in the plurality of SDR-EDR image pairs that serve as training data. These features can be used to train the weights that are to be used in the estimation process (162) to generate the composer prediction coefficients. In some embodiments, the training process (160) implements a general linear model (GLM) as the ML model; thus, the weights of the ML model are coefficients of the general linear model.

Optimized values for the weights of the ML model (or the coefficients of the general linear model) can be obtained by minimizing a difference between (1) a predicted backward reshaping function predicted based on the weights of the ML model and (2) the reference backward reshaping function (e.g., built through CDF based matching, etc.). The optimized (or trained) values of the weights of the ML model may be stored online or offline. The trained ML model comprising the optimized values of the weights of the ML model can be used (e.g., subsequently, contemporaneously, etc.) in the (e.g., online, etc.) estimation process (162) to generate the composer prediction coefficients.

By way of example but not limitation, the composer prediction coefficients define or specify a luma backward LUT (BLUT). The prediction coefficients may comprise K predicted sample points (or predicted EDR codewords) on a set of (e.g., evenly spaced, variably spaced, fixed, etc.) SDR codewords.

Denote the $k^{th}$ SDR sample codeword of the $j^{th}$ SDR frame (or image) as $s_j^k$ and let the corresponding $k^{th}$ predicted sample point (or EDR codeword) of the $j^{th}$ EDR frame (or image) be denoted as $v_j^k$. Without loss of generality, both SDR sample codewords and predicted sample points (or EDR codewords) may be represented as normalized codewords, for example, in a range of [0 1). The $k^{th}$ predicted EDR codeword of the $j^{th}$ EDR frame (or image), $v_j^k$, can be estimated via the general linear model, as follows:

$$v_j^k = \sum_{t=0}^{T-1} w_t^k \cdot f_{jt} \qquad (1)$$

$$v_j^k = clip3\left(\sum_{t=0}^{T-1} w_t^k \cdot f_{jt}, 0, 1\right) \qquad (2)$$

where $f_{jt}$ is the $t^{th}$ measured feature value of the $j^{th}$ SDR frame; $w_t^k$ is the prediction coefficient for the $t^{th}$ measured feature at sample point k; and T is the number of features. The set of weights (or the coefficients of the general linear model) $\{w_t^k\}$ can be obtained from regression. Overall, a total of T*K coefficients may be used to predict the EDR codewords used to define or specify a sampled BLUT.

Image related features (as measured by $f_{jt}$) may be pre-defined in the general linear model. Generally, min/max/average values provide good indicators of the luma range of an image and of brightness levels of the image. Additionally, optionally or alternatively, distributions of pixel values in terms of luma intensity values and chroma values may be represented in the image related features in the general linear model.

For example, the image related features in the general linear model may include the following three sets of features in three categories.

Feature Set 1 is used to capture statistical values of SDR images and comprises: an average (or mean) luma value (denoted as $s_j^M$) for the $j^{th}$ SDR frame, min luma value of luma (denoted as $s_j^L$) for the $j^{th}$ SDR frame, and max luma value (denoted as $s_j^H$) for the $j^{th}$ SDR frame.

In some embodiments, Feature Set 1 may comprise higher order features in addition to the above-mentioned features, as follows:

$$\{s_j^M, (s_j^M)^2, (s_j^M)^3, \ldots\} \qquad (3\text{-}1)$$

$$\{s_j^L, (s_j^L)^2, (s_j^L)^3, \ldots\} \qquad (3\text{-}2)$$

$$\{s_j^H, (s_j^H)^2, (s_j^H)^3, \ldots\} \qquad (3\text{-}3)$$

Note that broadly speaking, higher order features can be used to take into account of higher-order non-linear characteristics of backward reshaping functions; hence the trained model using the higher order features could become more accurate than otherwise. However, incorporating higher order features in the trained model also increases computational complexity in the training process (160) and the estimation process (162). More importantly, incorporating higher order features in the trained model could very well introduce singularity and/or overfitting, for example while optimizing the coefficients of the general linear model. In some embodiments, one or more cross-validation methods can be deployed to avoid or ameliorate these problems or issues. Some SDR-EDR image pairs in the training database may be set aside as validation data to detect and resolve any overfitting issues. Additionally, optionally or alternatively, one or more constraints or regularization terms/factors may be introduced, for example, in a cost function (or error function) for minimizing the difference between (1) the predicted backward reshaping function predicted based on the weights of the ML model and (2) the reference backward reshaping function (e.g., built through CDF based matching, etc.).

In some embodiments, the $1^{st}$ order to the $4^{th}$ order features as shown in expressions (2) may be included in Feature Set 1.

Feature Set 2 can be used to capture a distribution of luma values, and comprises luma bins in an $N_L$-bin luma histogram. Feature set 3 can be used to capture a distribution of chroma saturation, and comprise an $N_C$-bin chroma histogram. The features in Feature Set 2 and 3 can be captured as follows.

Let $(s_{jp}^Y, s_{jp}^{Cb}, s_{jp}^{Cr})$ be the normalized (e.g., in the range of [0, 1), etc.) luma and chroma values of $p^{th}$ SDR pixel at the $j^{th}$ SDR frame. In some embodiments, SDR luma pixel values may be downsampled to match spatial dimensions of SDR chroma channels (e.g., in chroma sampling formats such as 420, 422, etc.).

Let $\bar{h}_{N_L}^Y$ be the $N_L$-bin luma histogram and $\bar{\pi}_{N_C}^C$ be the $N_C$-bin chroma saturation measured and collected according to corresponding luma value(s). Denote the total number of pixels in each luma or chroma channel as P. An example procedure for generating Feature Sets 2 and 3 is illustrated in TABLE 1 as follows:

TABLE 1

// initialization
$\bar{h}_{N_L}^Y$ (b) = 0 for b = 0, 1, . . . , $N_L$ − 1 // luma bins
$\bar{\pi}_{N_C}^C$ (b) = 0 for b = 0, 1, . . . , $N_C$ − 1 // chroma saturation in luma bins
$\bar{h}_{temp,N_C}^Y$ (b) = 0 for b = 0, 1, . . . , Nc − 1// luma bins for normalizing chroma saturation
// collecting luma histogram and chroma saturation in luma bins
for (p = 0; p <P; p++)
  // find the luma bin index for $p^{th}$ pixel
  $b_L = \lfloor s_{jp}^Y \cdot N_L \rfloor$ // Quantization of codewords into $N_L$ bins
  $b_C = \lfloor s_{jp}^Y \cdot N_C \rfloor$ // Quantization of codewords into $N_C$ bins
  // compute luma histogram for $N_L$ bins
  $\bar{h}_{N_L}^Y (b_L) = \bar{h}_{N_L}^Y(b_L) + 1$
  // compute chroma saturation for the luma bin
  $\bar{\pi}_{N_C}^C (b_C) = \bar{\pi}_{N_C}^C (b_C) + (s_{jp}^{Cb} - 0.5)^2 + (s_{jp}^{Cr} - 0.5)^2$
  // compute luma histogram for $N_C$ bins for for normalizing chroma saturation TABLE 1-continued $$\overline{h}_{temp,N_C}^Y(b_C) = \overline{h}_{temp,N_C}^Y(b_C) + 1$$
End
// normalizing chroma saturation with luma histogram
for ($b_C = 0$; $b_C < N_C$; $b_C$ ++)
  if($\overline{h}_{temp,N_C}^Y(b_C) > 0$)
  $$\pi_{N_C}^C(b_C) = \frac{\overline{\pi}_{N_C}^C(b_C)}{\overline{h}_{temp,N_C}^Y(b_C)}$$
  else
  $$\overline{\pi}_{N_C}^C(b_C) = 0$$
  end
End In some embodiments, the $N_L$-bin luma histogram comprises a total of eight (8) luma bins. The total number of features, $N_L$, in Feature Set 2 and the total number of features, $N_C$, in Feature Set 3 are thus given as follows:

$$N_L = N_C = 8 \quad (4)$$

In the present example, the three sets of features used in the general linear model of the ML based process of FIG. 1F comprise 4*3=12 features from Feature Set 1, 8 features from Feature Set 2, and 8 features from Feature Set 3, giving rise to a total of 28 features extracted from the SDR frame (or image).

Coefficient Optimization

By way of illustration, the training database comprises a total of F SDR-EDR image pairs for training purposes. The weights $\{w_t^k\}$ of the $k^{th}$ sample point can be obtained via the following procedure.

In block 190 (denoted as "read K-Pt BLUT values") of the training process (160) of FIG. 1F, all actual mapped EDR codewords (or values) may be collected from all F EDR images in the F SDR-EDR image pairs for the $k^{th}$ sample point. Each of the actual mapped EDR codewords in the F EDR images is collected from a respective SDR-EDR image pair in the F SDR-EDR image pairs. Each such actual mapped EDR codeword collected from the respective SDR-EDR image pair can be determined as a mapped EDR codeword to which the $k^{th}$ SDR sample codeword in the SDR image in the respective SDR-EDR image pair is mapped in a distribution of EDR codewords of the EDR image in the respective SDR-EDR image pair.

For example, a distribution of SDR codewords in the SDR image in the respective SDR-EDR image pair may be represented by an SDR CDF computed from actual SDR codewords of the SDR image. Likewise, a distribution of EDR codewords in the EDR image in the respective SDR-EDR image pair may be represented by an EDR CDF computed from actual EDR codewords of the EDR image. The actual mapped EDR codeword collected from the respective SDR-EDR image pair can be determined as an EDR codeword at which the value of the EDR CDF equals or matches with the value of the SDR CDF at the $k^{th}$ SDR sample codeword.

The actual mapped EDR codewords collected from all the F EDR images in the F SDR-EDR image pairs for the $k^{th}$ sample point may be represented as a vector as follows:

$$v^k = \begin{bmatrix} v_0^k \\ v_1^k \\ \vdots \\ v_{F-1}^k \end{bmatrix} \quad (5)$$

The feature collected for the $j^{th}$ SDR frame may be represented as a vector as follows:

$$f_j = \begin{bmatrix} f_{j,0} \\ f_{j,1} \\ \vdots \\ f_{j,T-1} \end{bmatrix} \quad (6)$$

All collected features for all F SDR frames in the F SDR-EDR image pairs from the training database can be represented as a (e.g., transverse, etc.) vector as follows:

$$F = [f_0 f_1 \ldots f_{F-1}] \quad (7)$$

The weights (or coefficients of the general linear model) can be arranged in a vector form as follows:

$$w^k = \begin{bmatrix} w_0^k \\ w_1^k \\ \vdots \\ w_{T-1}^k \end{bmatrix} \quad (8)$$

The predicted or estimated mapped EDR codeword (or value) for the $j^{th}$ EDR frame may be given in the general linear model as follows:

$$\hat{v}_j^k = (f_j)^T w^k \quad (9)$$

In block 192 (denoted as "Coefficient Optimization") of the training process (160) of FIG. 1F, all predicted or estimated EDR codewords (or values) in all the EDR images of the F SDR-EDR image pairs are collected into a vector as follows:

$$\hat{v}^k = \begin{bmatrix} \hat{v}_0^k \\ \hat{v}_1^k \\ \vdots \\ \hat{v}_{F-1}^k \end{bmatrix} \quad (10)$$

Based on expressions (9) and (10), all the predicted or estimated EDR in all the EDR images of the F SDR-EDR image pairs may be rewritten in a matrix form as follows:

$$\hat{v}^k = F^T w^k \quad (11)$$

The problem to find the optimized values $w_{opt}^k$ of the weights $w^k$ may be formulated as an optimization problem to minimize a prediction error as follows:

$$w_{opt}^k = \underset{w^k}{\operatorname{argmin}} \|v^k - \hat{v}^k\|^2 \quad (12)$$

The optimized weight values $w_{opt}^k$ can be obtained via the least squared solution as follows:

$$w_{opt}^k = (FF^T)^{-1}(F v^k) \quad (13)$$

The above optimization can be performed to generate optimized weight values $w_{opt}^k$ (or prediction coefficients; denoted as "trained weights for linear model" in FIG. 1F) for each sample point k, where k is an integer between 0 and K−1, where K is the total number of sample points.

BLUT Generation

In the estimation process (162), an input SDR video (e.g., comprising the SDR images (117), etc.) is processed using the optimized weight values generated by the trained ML model (or the general linear model) to generate the composer prediction coefficients for each frame (or image) in the input SDR video. Additionally, optionally or alternatively, a post-processing module may be used in the estimation process (162) to ensure predicted backward reshaping functions for the input SDR video to possess smoothness and/or monotonically non-decreasing characteristics.

More specifically, in block 188 of the estimation process (162) of the ML based process of FIG. 1F, the same types of features (e.g., Feature Sets 1-3, etc.) are extracted from the new SDR image as those types of features (e.g., Feature Sets 1-3, etc.) used in the training process (160) that derive the optimized weight values $\{w_{opt}^k\}$. In block 196 (denoted as "Estimate k-Pt BLUT values using the model") of the estimation process (162), the optimized weight values $\{w_{opt}^k\}$ can be used to predict or estimate EDR codewords that correspond to SDR codewords of a new SDR image (or frame) based on the same types of extracted features (e.g., Feature Sets 1-3, etc.) extracted from the new SDR image.

The predicted or estimated EDR codewords and the SDR codewords to which the predicted or estimated EDR codewords correspond may be used to construct an optimized backward reshaping curve/function (e.g., parametrized curve/function, BLUT, approximating polynomials, etc.) to be used in a backward reshaping (or prediction) process.

More specifically, in block 188 of the estimation process (162), for each new SDR image (e.g., in a sequence of SDR images representing a SDR video), the features are first collected from each such new SDR image. Then, for each such new SDR image, a linear predictor with the optimized values $w_{opt}^k$, can then be used to predict K predicted/estimated EDR codewords for K SDR sample codewords.

The K predicted/estimated EDR codewords and the K SDR sample codewords together form K sample points $(s^k, \hat{v}_j^k)$. A backward reshaping function/curve (e.g., parametrized function/curve, BLUT, etc) can be constructed to cover up to an entire range of all available SDR codewords (e.g., in a 8-bit codeword space, in a 10-bit codeword space, etc.) using these K sample points $(s^k, \hat{v}_j^k)$.

Let $B_j^K$ denote a K-point BLUT that is generated using the K sample points $(s^k, \hat{v}_j^k)$, where k=0, ..., K−1. In block 198 (denoted as "Filtering, Interpolation and Clipping") of the estimation process (162) of FIG. 1F, the K-point BLUT can be interpolated and clipped whenever an SDR codeword is less than the minimal valid SDR codeword or more than the maximal valid SDR codeword (e.g., out of the SMPTE range, etc.). Let $B_j^I$ denote a BLUT that is generated by interpolating and clipping the K-point BLUT $B_j^K$.

Monotonically Non-Decreasing Property

Figure 2B:
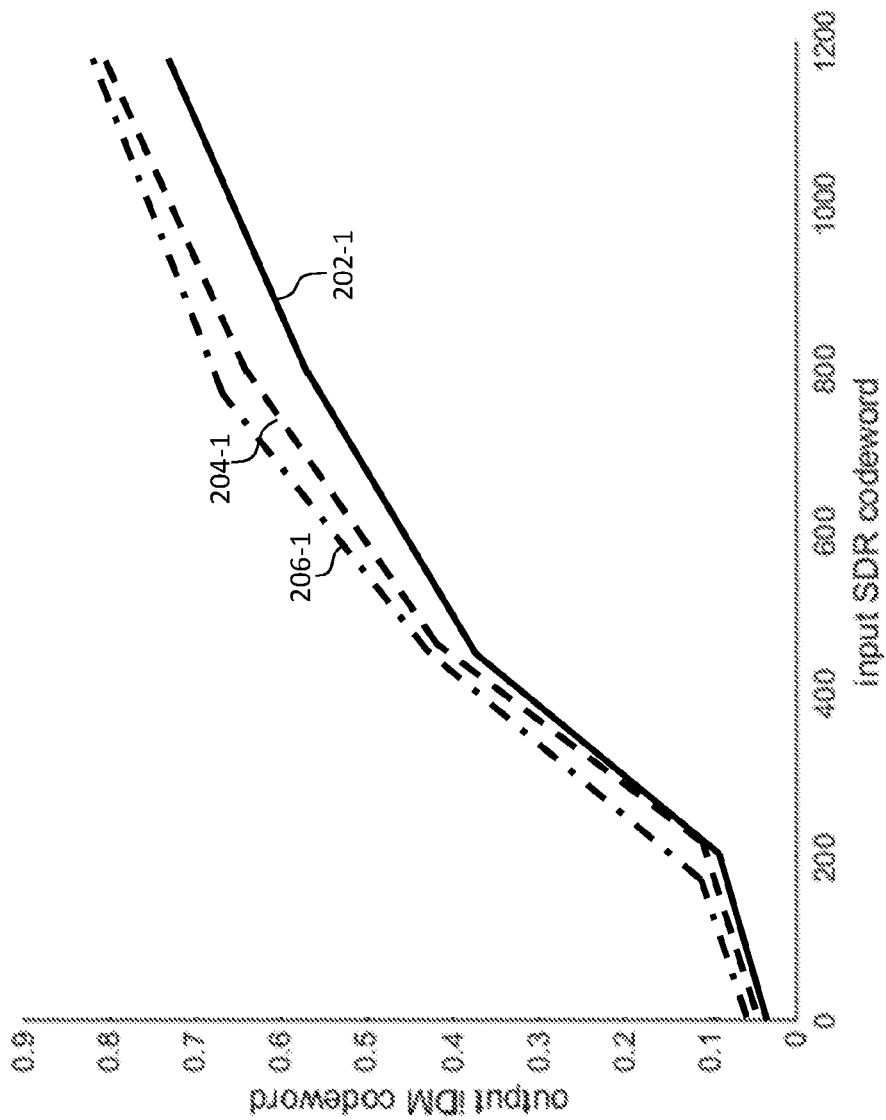
Figure 2C:
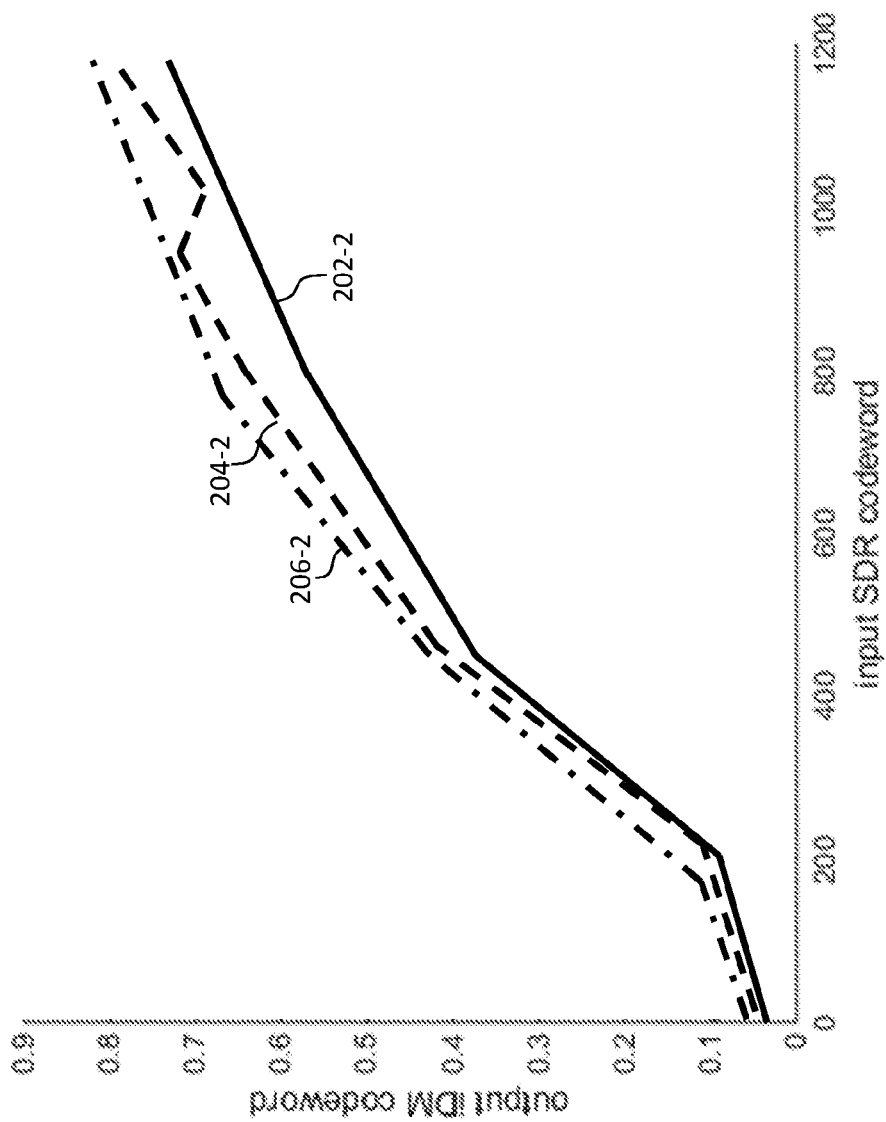

FIG. 2B and FIG. 2C illustrate several example BLUTs. A first example BLUT 204-1 as illustrated in FIG. 2B represents an interpolated BLUT $B_j^I$ that satisfies a monotonically non-decreasing condition, whereas a second example BLUT 204-2 as illustrated in FIG. 2C represents an interpolated BLUT $B_j^I$ that violates the condition. The first BLUT (204-1) and the second BLUT (204-2) may be respectively obtained through interpolating and clipping two corresponding K-point BLUT $B_j^K$ for two SDR images. Both of the first BLUT (204-1) and the second BLUT (204-2) are better matches to reference backward reshaping curves 206-1 and 206-2, as compared with backward reshaping curves 202-1 and 202-2 selected in the static mode. Here, the reference backward reshaping curves (204-1 and 204-2) may be generated using the process flow of FIG. 1B in the reference mode when reference EDR images for the SDR images are available as references/targets for generating the reference backward reshaping curves (204-1 and 204-2).

Whether an interpolated BLUT (e.g., in FIG. 2C, etc.) violates this monotonically non-decreasing condition can be traced back to differential values between adjacent sample points in a K-point BLUT from which the interpolated BLUT is obtained (e.g., through interpolation and clipping as mentioned above, etc.).

For example, the $k^{th}$ differential BLUT value (denoted as $\beta_j^k$) for the K-point BLUT $B_j^K$ may be computed as follows:

$$\beta_j^k = B_j^K(s^{k+1}) - B_j^K(s^k) \text{ for all } k=0,1,\ldots,K-2 \quad (14)$$

To maintain the monotonically non-decreasing property in the (e.g., initial, etc.) K-point BLUT $B_j^K$, the $k^{th}$ differential BLUT value satisfies a condition as follows:

$$\beta_j^k \geq 0 \text{ for all } k=0,1,\ldots,K-2 \quad (15)$$

All differential BLUT values of the first interpolated BLUT $B_j^I$ as illustrated in FIG. 2B satisfy the condition set forth in expression (15).

In contrast, some differential BLUT values of the second interpolated BLUT $B_j^I$ as illustrated in FIG. 2C do not satisfy the condition set forth in expression (15). This can happen because the general linear model estimates the K-point BLUT EDR codewords (or values) individually based on the trained weights (or the optimized weight values $w_{opt}^k$) and the features (e.g., min luma value, max luma value, average luma value, SDR luma histogram bins, SDR color saturation values for the SDR luma histogram bins, etc.) extracted from an SDR image. As the predicted or estimated EDR codewords (or values) are estimated independently of one other, the condition set forth in expression (15) may not be satisfied, thereby giving rise to a violation of the monotonically non-decreasing condition by the interpolated BLUT $B_j^I$ simply constructed from the K-point BLUT $B_j^K$ by interpolation (and/or clipping).

Techniques as described herein can be used to ensure that a transfer function (e.g., an interpolated BLUT, a final BLUT $B_j$, a backward reshaping function to be used by downstream devices to predict EDR images, etc.) satisfies a monotonically non-decreasing condition such that EDR codewords as predicted/estimated from SDR codewords by the transfer function are non-decreasing as the SDR codewords become larger in values. The satisfaction of the monotonically non-decreasing condition helps ensure a consistent behavior of a composed EDR video as predicted from a corresponding SDR video such that EDR pixel intensities do not decrease with the increase in SDR pixel intensities.

In some embodiments, to produce a monotonically non-decreasing final BLUT, the monotonic non-decreasing condition may be enforced on the K-point BLUT as a part (e.g., as a constraint, etc.) of defining the general linear model.

Additionally, optionally or alternatively, to produce the monotonically non-decreasing final BLUT, the monotonic non-decreasing condition may be enforced on an already constructed interpolated full-range BLUT. For example, CDF based matching may be used to provide an effective way to rebuild the interpolated full-range BLUT that may or may not satisfy the monotonically non-decreasing condition into a modified interpolated full-range BLUT that does satisfy the monotonically non-decreasing condition.

The first step is to build an SDR (e.g., luma, etc.) histogram based on SDR codewords in an (input) SDR image and a corresponding EDR (e.g., luma, etc.) histogram based on EDR codewords that are predicted or estimated using the interpolated BLUT that may or may not satisfy the monotonically non-decreasing condition. The more the histogram bins are used, the higher the accuracy of CDF based matching is achieved.

Denote a luma normalized value of the $p^{th}$ pixel in the input SDR image for the $j^{th}$ frame as $s_{jp}^Y$. The SDR histogram (denoted as $\overline{h}^s()$) may comprise $2^M$ histogram bins corresponding to respective M-bit codewords, and may be built for the input SDR image that comprises P pixels based on example pseudocode as shown in TABLE 2.

TABLE 2

// initialization the SDR histogram
$\overline{h}^s$ (b) = 0 for b = 0, 1, . . . , $2^M$ – 1
for(p = 0; p < P; p++)
   // update SDR bin histogram
   $\overline{h}^s$ ($\lceil s_{jp}^Y \cdot 2^M \rceil$) ++// take the ceiling integer of the product
End The EDR luma histogram (denoted as $\overline{h}^v()$) may be built using the interpolated BLUT $B_j^I$ (which may or may not satisfy the monotonically non-decreasing condition) and the SDR luma histogram $\overline{h}^s()$ based on example pseudocode as shown in TABLE 3.

TABLE 3

//initialization
$\overline{h}^v$ (b) = 0 for b = 0, 1, . . . , $2^M$ – 1
for(b = 0; b < $2^M$; b ++)
   // find the mapped EDR bin index $\overline{b}$ from SDR bin index b
   $\overline{b} = \lfloor 2^M \cdot B_j^I(b) \rfloor$
   // update EDR $\overline{b}$ bin histogram by adding from SDR b bin
   $\overline{h}^v$ ($\overline{b}$) = $\overline{h}^v$ ($\overline{b}$) + $\overline{h}^s$ (b)
End With both $\{\overline{h}^v(b)\}$ and $\{\overline{h}^s(b)\}$ available, the CDF based matching method may be used to build the final BLUT that does satisfy the monotonically non-decreasing condition. For example, SDR and EDR CDFs can be constructed from histograms $\{\overline{c}^v(b)\}$ and $\{\overline{c}^s(b)\}$, respectively, as follows:

$$\overline{c}^v(b) = \sum_{i=0}^{b} \overline{h}^v(i) \quad (16\text{-}1)$$

$$\overline{c}^s(b) = \sum_{i=0}^{b} \overline{h}^s(i) \quad (16\text{-}2)$$

A CDF value $\overline{c}^s(b)$ for each input SDR codeword b can be used to find a corresponding EDR bin index b' in the EDR CDF such that $\overline{c}^v(b') \leq \overline{c}^s(b) \leq \overline{c}^v(b'+1)$. In some embodiments, an interpolated value between (b') and (b'+1) is determined for example by a bilinear interpolation method, and is used in place of the lower bound value b'. Examples of bilinear interpolation can be found in U.S. Provisional Patent Application No. 62/404,307 as previously mentioned.

As a result, a SDR-to-EDR mapping function from $\{b\} \rightarrow \{b'\}$ is generated. This mapping function satisfies the monotonically non-decreasing condition and may be denoted as $B_j^m$ for composing the $j^{th}$ EDR image from the $j^{th}$ SDR image.

Additionally, optionally or alternatively, a smoothening operation can be performed on the mapping function $B_j^m$ with an averaging filter to generate a smoothened mapping function $B_j$ as follows:

$$B_j(x) = \sum_{u=-W}^{W} \frac{1}{2W+1} B_j^m(x+u) \quad (17)$$

where 2 W+1 is a moving window (centered at a SDR codeword x) of SDR codewords over which the mapping function $B_j^m$ is averaged or smoothened.

In some embodiments, the smoothened mapping function of expression (17) may represent a final BLUT $B_j$. In some embodiments, the final BLUT $B_j$ can be further approximated with a set of polynomials (e.g., an 8-piece $2^{nd}$ order polynomial, etc.). Parameters such as pivots, slopes, coefficients, offsets, etc., can be passed as composer prediction coefficients as described herein.

Figure 2D:
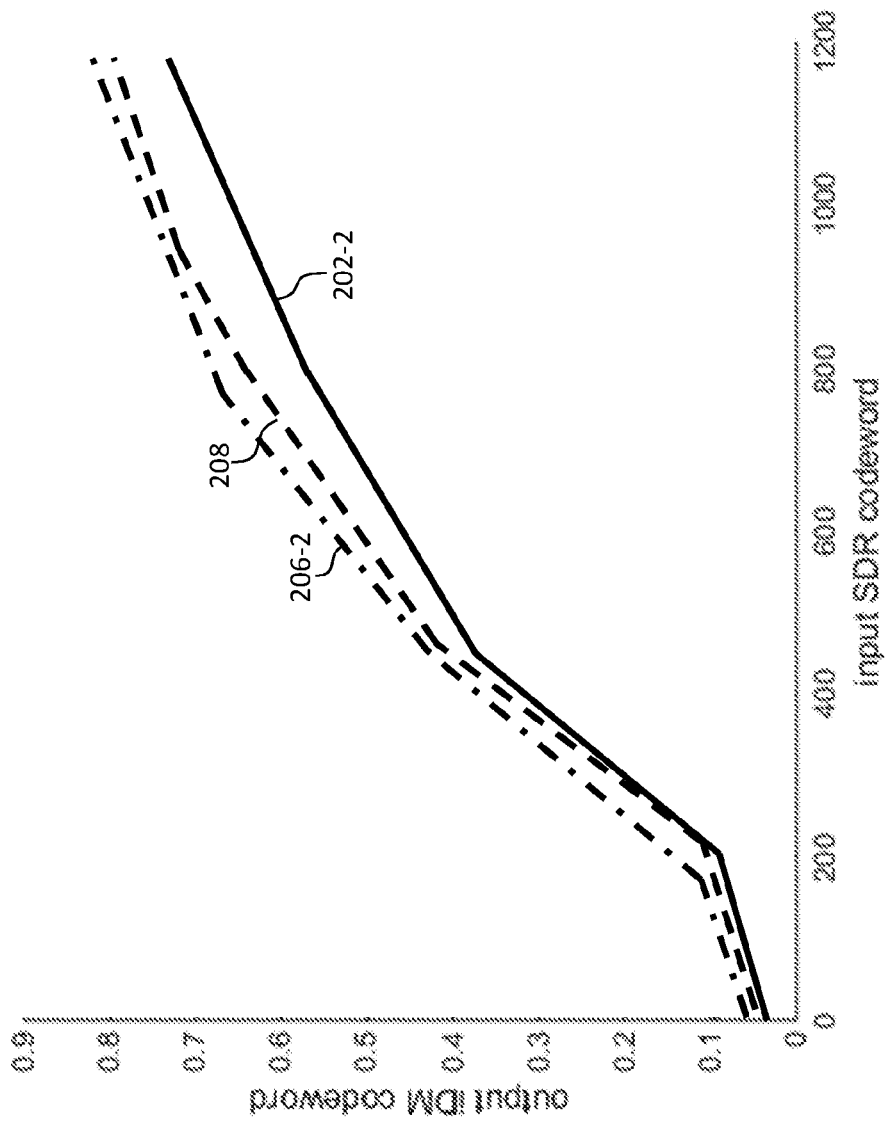

FIG. 2D illustrates an example final BLUT $B_j$ 208 that is rebuilt from the interpolated BLUT $B_j^I$ of FIG. 2C through CDF-based matching. As shown, the final BLUT $B_j$ (208) of FIG. 2D satisfies the monotonically non-decreasing condition, even though the interpolated BLUT $B_j^I$ of FIG. 2C does not.

DM Metadata Estimation and Generation

Techniques can be used to generate DM metadata in the EDR domain using one or more in a variety of methods and algorithms based at least in part on composition metadata. These methods and algorithms may include, but are not necessarily limited to only, any of: using original equations for computing the DM metadata in the EDR domain (e.g., in a DM color space, in an EDR RGB color space, etc.); using approximation equations for computing the DM metadata in the EDR domain (e.g., in a composition color space, in an EDR YCbCr color space, etc.); generating the DM metadata in the EDR domain by mapping (e.g., via 1D-LUT, etc.) DM related values computed in the SDR domain (e.g., in an SDR YCbCr color space, etc.); etc.

By way of illustration but not limitation, the DM metadata to be included in the video signal with the composer metadata and the SDR images (117) is to be measured in a PQ P3 domain in an EDR RGB color space. It should be noted that in various embodiments, the DM metadata may be generated or measured in a different DM color space other than the EDR RGB color space as illustrated here. In some embodiments, the EDR RGB color space may represent a display color space of a reference EDR display.

Given input SDR YCbCr (or YUV) images, EDR YCbCr (or YUV) images can be generated through composition/prediction. In some embodiments, the EDR YCbCr (or YUV) images can be generated and converted from the EDR YCbCr color space which is the composition color space—to the EDR RGB color space for the purpose of generating the DM metadata in the EDR RGB color space.

The DM metadata to be measured in the PQ P3 domain in the EDR RGB color space may comprise, without limitation, the minimal value (denoted as "min") for all pixel values for all channels for each EDR image, the maximal value (denoted as "max") for all pixel values for all channels for each EDR image, the average value (denoted as "avg") for all pixel values for all channels for each EDR image, the standard deviation value (denoted as "std") for all pixel values for all channels for each EDR image, etc. The min, max and avg values may be called L1 metadata. The std value may be called L4 metadata. Examples of display management operations based at least in part on the L1 and L4 metadata can be found in U.S. Provisional Patent Application No. 62/437,960, filed on Dec. 22, 2016, the entire contents of which are hereby incorporated by reference as if fully set forth herein.

Denote the {R,G,B} channel for the $p^{th}$ pixel at the $j^{th}$ EDR image as $\{v_{jp}^R, v_{jp}^G, v_{jp}^B\}$ after normalization (so EDR codewords or values are between [0 1)). The L1 and L4 metadata can be obtained with original EDR RGB equations as follows:

$$L_j^{min} = \min\{v_{jp}^R, v_{jp}^G, v_{jp}^B \mid \forall\, p\} \qquad (18\text{-}1)$$

$$L_j^{max} = \max\{v_{jp}^R, v_{jp}^G, v_{jp}^B \mid \forall\, p\} \qquad (18\text{-}2)$$

$$L_j^{avg} = \frac{1}{3P}\sum_{p=0}^{P-1}(v_{jp}^R + v_{jp}^G + v_{jp}^B) \qquad (18\text{-}3)$$

$$L_j^{std} = \sqrt{\frac{1}{3P}\sum_{p=0}^{P-1}\left((v_{jp}^R - L_j^{avg})^2 + (v_{jp}^G - L_j^{avg})^2 + (v_{jp}^B - L_j^{avg})^2\right)} \qquad (18\text{-}4)$$

Estimation using Y Channel in YCbCr Domain

Some or all of the DM metadata in the EDR domain including but not limited to the L1 and L4 metadata as represented in the original EDR RGB equations can be estimated using predicted EDR codewords (or values) in the composition color space such as those of the Y component in the EDR YCbCr color space without actually generating EDR RGB images.

Denote $\{Y, Cb, Cr\}$ EDR codewords (or values) of an EDR pixel in the $j^{th}$ EDR YCbCr image as $\{v_{jp}^Y, v_{jp}^{Cb}, v_{jp}^{Cr}\}$. The EDR codewords of the $j^{th}$ EDR RGB image in the EDR RGB color space are related to the EDR codewords of the $j^{th}$ EDR YCbCr image in the EDR YCbCr color space as follows:

$$\begin{bmatrix} v_{jp}^R \\ v_{jp}^G \\ v_{jp}^B \end{bmatrix} = \begin{bmatrix} a_{00} & a_{01} & a_{02} \\ a_{10} & a_{11} & a_{12} \\ a_{20} & a_{21} & a_{22} \end{bmatrix}\left(\begin{bmatrix} v_{jp}^Y \\ v_{jp}^{Cb} \\ v_{jp}^{Cr} \end{bmatrix} - \begin{bmatrix} b_0 \\ b_1 \\ b_2 \end{bmatrix}\right) \qquad (19)$$

For the composed EDR images that are in compliance with Rec. 709, the 3×3 matrix (denoted as "a full range matrix") and the vector on the right-hand-side (RHS) of expression (19) are given, respectively, as follows:

$$\begin{bmatrix} a_{00} & a_{01} & a_{02} \\ a_{10} & a_{11} & a_{12} \\ a_{20} & a_{21} & a_{22} \end{bmatrix} = \begin{bmatrix} 1 & 0 & 1.5747 \\ 1 & -0.1873 & -0.4682 \\ 1 & 1.8556 & 0 \end{bmatrix} \qquad (20\text{-}1)$$

$$\begin{bmatrix} b_0 \\ b_1 \\ b_2 \end{bmatrix} = \begin{bmatrix} 0 \\ 0.5 \\ 0.5 \end{bmatrix} \qquad (20\text{-}2)$$

For the composed EDR images that are in compliance with SMPTE, the 3×3 matrix (denoted as "a SMPTE matrix") and the vector on the right-hand-side (RHS) of expression (19) are given, respectively, as follows:

$$\begin{bmatrix} a_{00} & a_{01} & a_{02} \\ a_{10} & a_{11} & a_{12} \\ a_{20} & a_{21} & a_{22} \end{bmatrix} = \begin{bmatrix} 1.1689 & 0 & 1.7996 \\ 1.1689 & -0.2141 & -0.5351 \\ 1.1689 & 2.1206 & 0 \end{bmatrix} \qquad (21\text{-}1)$$

$$\begin{bmatrix} b_0 \\ b_1 \\ b_2 \end{bmatrix} = \begin{bmatrix} 0.0625 \\ 0.5 \\ 0.5 \end{bmatrix} \qquad (21\text{-}2)$$

Thus, approximation relations can be established using the full range matrix and the corresponding vector, as follows:

$$v_{jp}^R + v_{jp}^G + v_{jp}^B = 3 \cdot v_{jp}^Y + 1.66 \cdot (v_{jp}^{Cb} - 0.5) + 0.54 \cdot (v_{jp}^{Cr} - 0.5) \approx 3 \cdot v_{jp}^Y \qquad (22\text{-}1)$$

$$(v_{jp}^R)^2 + (v_{jp}^G)^2 + (v_{jp}^B)^2 \approx 3 \cdot (v_{jp}^Y)^2 \qquad (22\text{-}2)$$

The min, max and avg values in the L1 metadata can be estimated as follows:

$$L_j^{min} \approx \min\{v_{jp}^Y \mid \forall\, p\} \qquad (23\text{-}1)$$

$$L_j^{max} \approx \max\{v_{jp}^Y \mid \forall\, p\} \qquad (23\text{-}2)$$

$$L_j^{avg} \approx \frac{1}{P}\sum_{p=0}^{P-1} v_{jp}^Y \qquad (23\text{-}3)$$

The standard deviation value in the L4 metadata can be estimated as follows:

$$L_j^{std} \approx \sqrt{\left(\frac{1}{P}\sum_{p=0}^{P-1}(v_{jp}^Y)^2\right) - (L_j^{avg})^2} \qquad (23\text{-}4)$$

Likewise, the following approximation relations can be established using the SMPTE matrix and the corresponding vector, as follows:

$$v_{jp}^R + v_{jp}^G + v_{jp}^B = 3 \cdot 1.1689 \cdot (v_{jp}^Y - 0.0625) + 1.9065 \cdot (v_{jp}^{Cb} - 0.5) + 1.2645 \cdot (v_{jp}^{Cr} - 0.5) \approx 3.5 \cdot (v_{jp}^Y - 0.0625) \qquad (24)$$

The min, max and avg values in the L1 metadata in the original EDR RGB equations can be estimated from EDR YCbCr codewords as follows:

$$L_j^{min} \approx \min\{v_{jp}^Y \mid \forall\, p\} \qquad (25\text{-}1)$$

$$L_j^{max} \approx \max\{v_{jp}^Y \mid \forall\, p\} \qquad (25\text{-}2)$$

$$L_j^{avg} \approx \frac{1}{P}\sum_{p=0}^{P-1}\frac{3.5067}{3}(v_{jp}^Y - 0.0625) \qquad (25\text{-}3)$$

The standard deviation value in the L4 metadata in the original EDR RGB equations can be estimated from EDR YCbCr codewords as follows:

$$L_j^{std} \approx \sqrt{\frac{\sum_{p=0}^{P-1}\left[\frac{3.5067}{3}(v_{jp}^Y - 0.0625)\right]^2 - P(L_j^{avg})^2}{(P-1)}} \qquad (25\text{-}4)$$

where 3.5067/3 denotes a simple form for 256/219.

Estimation in SDR Domain

As previously illustrated, the DM metadata in the EDR domain comprises statistics of EDR codewords in the EDR domain. In the reference mode (e.g., as illustrated in FIG. 1B, etc.), the statistics of EDR codewords may be collected from EDR codewords in either reference EDR images or inverse DM (EDR) images that serve as a reference in prediction operations. In the non-reference mode (e.g., as illustrated in FIG. 1C, etc.), the statistics of EDR codewords may be collected from EDR codewords in composed/predicted EDR images, as there may not be reference EDR images or inverse DM images before the composition/prediction.

To measure or collect the statistics (e.g., directly, etc.) in the EDR domain as illustrated in expressions (18) and (25) above, some or all EDR codewords of the composed/predicted EDR images are generated specifically for helping generate the DM metadata. This EDR image composition (or prediction) could still consume significant computation power, even though subsampling may be employed to reduce the number of EDR codewords for computing the statistics in the EDR domain.

In some embodiments, instead of directly collecting the statistics in the EDR domain, statistics may be first collected (e.g., by the DM metadata generator (176) of FIG. 1D, etc.) in the SDR domain with SDR codewords already available without any composition or prediction of EDR images specifically for helping generate the DM metadata. Since the backward reshaping function/curve (or the BLUT) is available (e.g., from the composer prediction module (180) to the DM metadata generator (176) of FIG. 1D, etc.), the statistics in EDR domain can be relatively easily estimated (e.g., by the DM metadata generator (176) of FIG. 1D, etc.) from the SDR domain with the backward reshaping function/curve (or the BLUT).

Denote $\{Y, Cb, Cr\}$ SDR codewords—which may be normalized into a range of $[0, 1)$—of the $p^{th}$ SDR pixel of the $j^{th}$ SDR image as $\{s_{jp}^Y, s_{jp}^{Cb}, s_{jp}^{Cr}\}$. As previously discussed, the composition/prediction of the $j^{th}$ EDR image may be performed with the (e.g., final, etc.) BLUT for luma channel Y that satisfies a monotonically non-decreasing condition.

A luma EDR codeword of the $p^{th}$ EDR pixel of the $j^{th}$ EDR image that corresponds to the $j^{th}$ SDR image can be derived based on the BLUT as follows:

$$v_{jp}^Y = B_j(2^{n_i} \cdot s_{jp}^Y) \quad (26)$$

The min and max values in the L1 metadata in the EDR domain (or in the $j^{th}$ EDR image) can be estimated from the min and max values in the SDR domain (or in the $j^{th}$ SDR image) as follows:

$$\min\{v_{jp}^Y\} = B_j(\min\{2^{n_i} \cdot s_{jp}^Y\}) \quad (27\text{-}1)$$

$$\max\{v_{jp}^Y\} = B_j(\max\{2^{n_i} \cdot s_{jp}^Y\}) \quad (27\text{-}2)$$

Since the BLUT is a non-linear function, the avg value in the SDR domain may not correspond to the avg value in the EDR domain through a single-value mapping based on the BLUT. This issue can be resolved through the use of the SDR (e.g., luma, etc.) histogram and the BLUT. Denote the $b^{th}$ bin of the SDR histogram of the $j^{th}$ SDR image as $\bar{h}_j^s(b)$. Denote a representative SDR codeword (e.g., a center point, a mid value, etc.) for the $b^{th}$ bin as $r_b$.

The avg value in the L1 metadata in the EDR domain (or in the $j^{th}$ EDR image) can be estimated from the SDR histogram and the BLUT as follows:

$$\hat{v}_j^M = \frac{1}{P}\sum_{b=0}^{M-1} \bar{h}_j^s(b) \cdot B_j(r_b) \quad (27\text{-}3)$$

The computation of the std value in the L4 metadata in the EDR domain has the same issue as the computation of the avg value in the L1 metadata in the EDR domain as discussed above due to the fact that the BLUT may be a non-linear function.

However, the std value in the L4 metadata in the EDR domain (or in the $j^{th}$ EDR image) can also be estimated from the SDR histogram and the BLUT, as follows:

$$v_j^{std} \approx \sqrt{\frac{\sum_{b=0}^{M-1} \bar{h}_j^s(b) \cdot [B_j(r_b)]^2 - P(\hat{v}_j^M)^2}{(P-1)}} \quad (27\text{-}4)$$

As can be seen above, the DM metadata in the EDR domain can be mapped from statistical measurements of the input SDR signal (or SDR images) based at least in part on the backward reshaping function/curve (or the BLUT), without composing corresponding EDR images by the upstream encoding device. As a result, a significant amount of computation can be avoided using this method of deriving the DM metadata in the EDR domain through the statistics and distributions (e.g., histograms, etc.) computed in the SDR domain.

Note that $\{B_j(r_b)\}$ and $\{B_j(r_b)\}^2$ can be precomputed (e.g., during the system boot up stage, etc.) for the static non-reference mode in which all candidate BLUTs can be preconfigured. Even for the dynamic non-reference mode in which the BLUT is estimated in a general linear model with the features extracted from an SDR image, there is not much additional computation for $B_j(r_b)\}$ and $\{B_j(r_b))^2\}$. The entire derivation of these statistics in the EDR domain can be greatly simplified to essentially finding the SDR histogram $\{h_{jb}\}$ without much additional computation (especially when SDR DM metadata is already extractable from an input SDR video signal). In some embodiments, to further reduce computation burden, the SDR histogram can be constructed with (a smaller number of) remaining SDR pixels through subsampling/decimating SDR pixels of the SDR images.

Reformatting Bit Depth and Spatial Dimensions

In many cases, input SDR video signals are 8-bit YUV video signals with frame dimensions different than 1080p or 2160p. However, some video display applications may be configured to receive and process SDR image data and image related metadata in 10-bit YUV video signals.

FIG. 1G illustrates an encoder-side architecture for reformatting an input bit depth (e.g., 8 bits, etc.) and input frame (spatial) dimensions (e.g., other than 1080p or 2160p) to an output bit depth (e.g., 10 bits, etc.) and output frame (spatial) dimensions (e.g., 1080p or 2160p, etc.). The encoder-side codec architecture of FIG. 1G may be implemented with one or more computing processors in an upstream video encoder (e.g., coding block (120) of FIG. 1A, etc.).

The encoder-side architecture can be used to reformat an input SDR video signal of the input bit depth (denoted as $n_i$) and the input frame dimensions to an output SDR video signal of the output bit depth (denoted as $n_o$) and the output frame dimensions. The output SDR video signal may be of a video signal format that is already, or can be relatively easily made, compatible with certain display applications or systems that may have already been deployed in the field.

By way of illustration but not limitation, the encoder architecture of FIG. 1G is configured to receive an $n_i$-bit SDR video signal encoded with the SDR images (117) of frame dimensions ($W_i \times H_i$). The composer prediction module (180) operates in a static or dynamic non-reference mode to determine/generate composer prediction coefficients. The prediction coefficients can be generated without using any EDR images and without using any inverse DM images (e.g., generated by the inverse DM module (172) of FIG. 1B, etc.) as a reference (or a prediction target).

Let $\alpha^R$ be the codeword scaling factor 186 (e.g., a multiplier, etc.) as follows:

$$\alpha^R = 1 << (n_o - n_i) \tag{28}$$

Each input SDR luma codeword (or SDR luma pixel value) of the input bit depth in the SDR images (117) is multiplied with $\alpha^R$ to generate a corresponding SDR luma codeword of the output bit depth in scaled SDR images (117-1).

The prediction coefficients determined/generated by the composer prediction module (180) can be provided to the RPU (178) to be multiplexed or included in the coded bitstream (122) with the scaled SDR images (117-1) generated by scaling (e.g., codewords in, etc.) the input SDR images (117) with $\alpha^R$.

After a receiver (e.g., a decoder of FIG. 1E, etc.) receives the scaled SDR images (117-1) and the prediction coefficient, the receiver can use the prediction coefficients to generate predicted EDR images from the SDR images (117-1).

On the encoder side as illustrated in FIG. 1G, the SDR images (117-1) and the prediction coefficients are provided to the composer composing module (184) operating in the non-reference mode to compose some or all of EDR pixel values of EDR images.

The DM metadata generator (176) receives some or all of the EDR pixel values in the DM color space, and uses these EDR pixel values to estimate or compute or generate the DM metadata. The DM metadata can then be provided by the DM metadata generator (176) to the RPU (178) to be multiplexed or included in the coded bitstream (122) with the scaled SDR images (117-1) and the composer metadata.

The number of SDR pixels in an input SDR image and the number of SDR pixels in an output SDR image are given, respectively, as follows:

$$P_{in} = (W_i \times H_i) \tag{29-1}$$

$$P_{out} = (W_o \times H_o) \tag{29-2}$$

Input SDR codewords in the $j^{th}$ SDR image as scaled may be used to predict or compose EDR codewords in the $j^{th}$ EDR image that corresponds to the $j^{th}$ SDR image. Metadata statistics such as $L_j^{min}$, $L_j^{max}$, $L_j^{avg}$ and $L_j^{std}$ may be computed or estimated for the EDR codewords in the $j^{th}$ EDR image based on expressions (18) and (25).

Let $P^R$ be the number of padded pixels to complement $P_{in}$ input pixels in the $j^{th}$ SDR image to produce $P_{out}$ output pixels in the $j^{th}$ EDR image. Therefore, $$P^R = P_{out} - P_{in} \tag{30}$$

Let $s_{pR}^Y$ be the $n_i$-bit SDR luma codeword (or pixel value) to be used for padding. Let $v_{pR}^Y$ be the no-bit composed EDR luma codeword (or pixel value) computed from $s_{pR}^Y$ using the backward reshaping function.

DM metadata statistics such as $L_j^{R,min}$, $L_j^{R,max}$, $L_j^{R,avg}$ and $L_j^{R,std}$ for the $j^{th}$ EDR image, taking into account EDR codewords computed from padding SDR codewords, may be computed or estimated based on $L_j^{min}$, $L_j^{max}$, $L_j^{avg}$ and $L_j^{std}$, as follows:

$$L_j^{R,min} = \min(L_j^{R,min}, v_{pR}^Y) \tag{31-1}$$

$$L_j^{R,max} = \max(L_j^{R,max}, v_{pR}^Y) \tag{31-2}$$

$$L_j^{R,avg} = \frac{\left[P_{in} L_j^{R,avg} + P^R \left(\frac{3.5067}{3}\right)(v_{pR}^Y - 0.0625)\right]}{(P_{in} + P^R)} \tag{31-3}$$

$$L_j^{R,std} \approx \sqrt{\frac{\left\{\sum_{p=0}^{P_{in}-1}\left[\frac{3.5067}{3}(v_{jp}^Y - 0.0625)\right]^2 + P^R\left[\frac{3.5067}{3}(v_{pR}^Y - 0.0625)\right]^2\right\} - (P_{in} + P^R)(L_j^{R,avg})^2}{(P_{in} + P^R - 1)}} \tag{31-4}$$

Scene-Based Metadata Computation

The L1 DM metadata can be transmitted as a part of image-related metadata by a video encoder (e.g., coding block (120) of FIG. 1A, etc.) to a receiver (e.g., a video decoding device operating with an EDR display, etc.) to provide minimum, maximum, and average values of EDR images to be composed by the receiver. The L4 DM metadata can be transmitted as a part of the image-related metadata by the video encoder to the receiver to provide frame mean and standard deviation values.

Additionally, optionally or alternatively, scene-level L1 and L4 DM metadata including but not limited to minimum, maximum and average luminance values can be generated by the video encoder and sent to the receiver. Denote the left and right scene boundaries for the $j^{th}$ EDR as $f_j^{SC,(l)}$ and $f_j^{SC,(r)}$. The minimum luminance value (denoted as min_PQ) of a (e.g., current, etc.) scene may be computed as follows:

$$L_j^{min,SC} = \min_{i \in [f_j^{SC,(l)}, f_j^{SC,(r)}]} (L_i^{min}) \tag{32-1}$$

The maximum luminance value (denoted as max_PQ) of the scene may be computed as follows:

$$L_j^{max,SC} = \max_{i \in [f_j^{SC,(l)}, f_j^{SC,(r)}]} (L_i^{max}) \tag{32-2}$$

The midpoint luminance value (denoted as avg_PQ) of the scene may be computed as follows:

$$L_j^{avg,SC} = \frac{1}{(f_j^{SC,(r)} - f_j^{SC,(l)} + 1)} \cdot \sum_{i=f_j^{SC,(l)}}^{f_j^{SC,(r)}} L_i^{avg} \tag{32-3}$$

In some embodiments, filtered L1 and L4 DM metadata including but not limited to filtered average and standard deviation values of an (e.g., current, the $j^{th}$, etc.) EDR image can be generated by the video encoder and sent to the receiver.

Let $L_j^{PQ}$ and $L_j^{power}$ denote the filtered average and standard deviation values of the $j^{th}$ EDR image. Let $I_{sc}$ be an indicator function to specify scene cut (1: scene cut, 0: no scene cut). An example filter strength for the $j^{th}$ EDR image may be determined as follows:

$$\alpha_j^{L4} = \min(1, (I_{sc}(|L_j^{avg} - L_{j-1}^{avg}|)\alpha_{sc}^{L4} + \alpha_{base}^{L4})) \quad (33)$$

where $\alpha_{sc}^{L4}$ and $\alpha_{base}^{L4}$ may represent global dimming constants, which may be preconfigured by a user (e.g., $\alpha_{sc}^{L4}=6, 7, 8$, etc.; $\alpha_{base}^{L4}=0.1, 0.2, 0.4$, etc.).

The filtered average and standard deviation values of the $j^{th}$ EDR image may be determined as follows:

$$L_j^{PQ} = L_{j-1}^{PQ}(1-\alpha_n^{L4}) + L_j^{avg}\alpha_n^{L4} \quad (34\text{-}1)$$

$$L_j^{power} = L_{j-1}^{power}(1-\alpha_n^{L4}) + L_j^{std}\alpha_n^{L4} \quad (34\text{-}2)$$

As can be seen above, some of the L1/L4 metadata generated by the video encoder may be (e.g., heavily, etc.) dependent on the scene-cut information. In some embodiments, relatively accurate scene-cut information is available, for example in a form of an XML file. However, in some other embodiments, scene-cut information may need to be automatically detected from image content, for example by the video encoder, or a device operating in conjunction with the video encoder.

Sensitivity to False Scene Cut Detection

Automatic scene-cut detection (e.g., based on automatic image content analysis with no or little human input, etc.) may work well for some video content such as movies. However, false or missed scene cut detections can sometimes occur, especially in non-movie video content.

For example, false scene-cuts may be detected when a video has a burned-in caption. The burned-in caption can be on and off in a few frames of a scene, in a single scene or across multiple scenes. A scene can have a single burned-in caption or even multiple burned-in captions. Clean automatic scene cut detection can be difficult in the presence of these different behaviors of burned-in captions.

Scene-level values in the DM metadata such as scene-level minimum and maximum luminance values in the L1 metadata are sensitive to scene-cuts: the showing up of a new burned-in caption (e.g., comprising white bright pixels, etc.) brings the scene-level and image-level maximum luminance value up, whereas the disappearing of a burned-in caption brings the scene-level and image level maximum luminance value down.

In cases where the burned-in caption comprises a relatively small number of pixels as compared with the total number of pixels in an image, the scene-level and image-level average luminance value may not change much.

In some embodiments, the minimum and maximum luminance values (e.g., for some or all scenes, etc.) may be set as global values in a sequence of images (e.g., comprising multiple scenes, etc.) such as the minimum and maximum luminance values for the entire sequence, as follows:

$$L_j^{min,GL} = \min\{L_j^{min}|\forall j\} \quad (35\text{-}1)$$

$$L_j^{max,GL} = \max\{L_j^{max}|\forall j\} \quad (35\text{-}2)$$

In some embodiments, the average luminance value may be set to average luminance value computed for each scene, regardless of whether any of scene-cuts is a positive or negative detection.

In some operational scenarios, a single true scene may be falsely detected to be multiple (false) scenes. These multiple false scenes may have different average luminance values computed from images in different false scenes of the single true scene. Lighting control of a display may adjust lighting levels based at least in part on these average luminance values. As a result, flashing caused by lighting level adjustments may be observed through different false scenes in the true single scene.

To address this issue, a sliding window based estimation of the average luminance value may be employed. The average luminance value for each EDR image can be computed using a sliding window bounded by scene-cut information (e.g., a binary indicator indicating whether the EDR image is or is not a scene cut image, etc.).

Denote the (sliding) window-based average luminance value for the $j^{th}$ EDR image as $L_j^{avg,win}$. Denote the lookahead window length as $w_a^{L1}$, and the lookback window length as $w_b^{L1}$.

The left and right boundaries of the sliding (or averaging) window, denoted as $f_j^{(l)}$ and $f_j^{(r)}$, can be determined as follows:

$$f_j^{(l)} = \max(f_j^{SC,(l)}, f_j - w_b^{L1}) \quad (36\text{-}1)$$

$$f_j^{(r)} = \min(f_j^{SC,(r)}, f_j + w_a^{L1}) \quad (36\text{-}2)$$

Now, the sliding window based average luminance value for the $j^{th}$ EDR can be determined as follows:

$$L_j^{avg,win} = \frac{1}{(f_j^{(r)} - f_j^{(l)} + 1)} \cdot \sum_{f_j^{(l)}}^{f_j^{(r)}} L_i^{avg} \quad (37)$$

Figure 3:
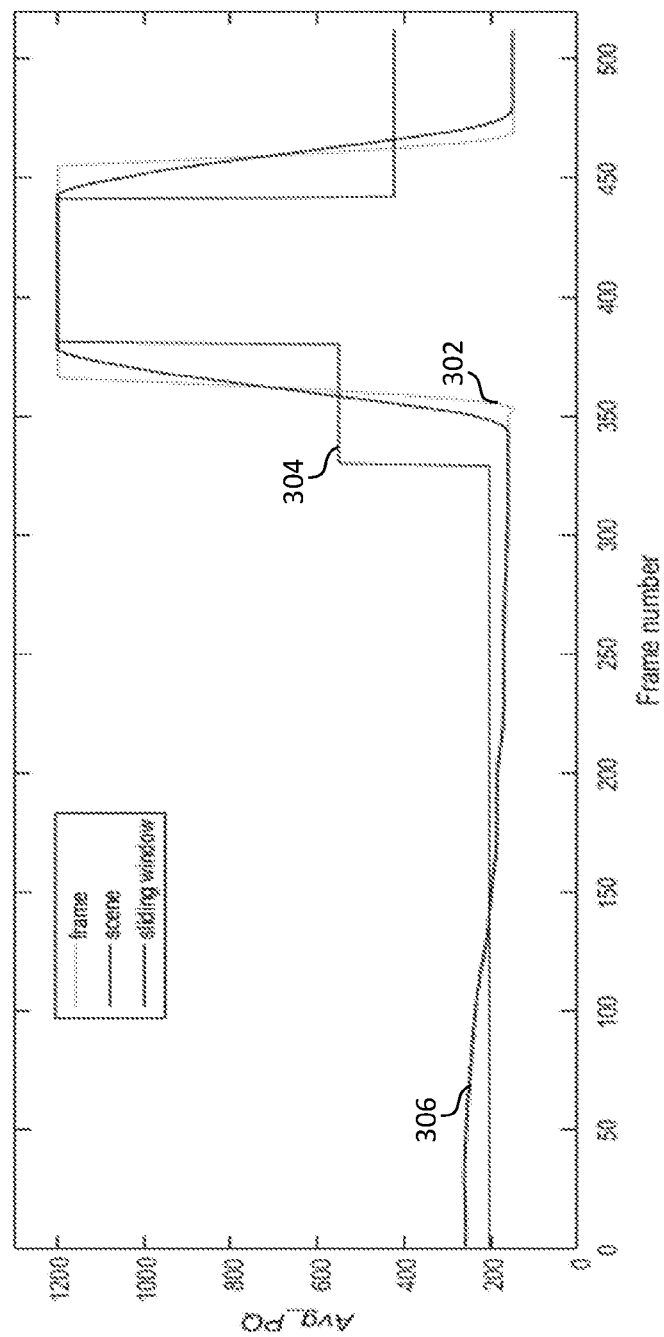
FIG. 3 illustrates example plots of average luminance values over a sequence of images.

FIG. 3 illustrates example plots of average luminance values over a sequence of images. A first plot 302 represents frame-level average luminance values each of which is computed based on a corresponding individual image in the sequence of images. A second plot 304 represents scene-level average luminance values each of which is computed for a corresponding scene in the sequence of images based on scene cut detections that may or may not be correct. A third plot 306 represents sliding-window average luminance values each of which is computed for an individual image based on both the scene cut detections and image-level average luminance values.

It can be observed that the image-level average luminance values can vary greatly. The scene-level average luminance values vary in steps based on detected scene-cuts. When false and/or missed scene-cuts occur, flashing may occur when these average luminance values are used to determine lighting control. The sliding-window based average luminance values produce a relatively smooth curve of luminance values based on local sliding window averages that avoid or reduce visible flashing even when a wrongly detected scene cut occurs.

In some embodiments, the backward reshaping functions as described herein are generated without performing clipping or trim passes and/or without causing complete informational loss in certain codeword regions of pixel values in mapping the SDR images to the composed EDR images. As a result, image details represented in the SDR images are preserved in the composed EDR images under techniques as described herein.

In some embodiments, the backward reshaping functions as described herein can be used to support any combination of a source color space in which the SDR images are represented and a target color space in which the composed EDR images are represented. Example source and/or target color spaces may include, but are not necessarily only to, any of: YCbCr color space, IPT color space, RGB color space, Rec. 2020 color space, Rec. 709 color space, etc.

SDR-to-EDR mappings (e.g., backward reshaping curves/functions, matrix based mappings, etc.) as described herein may, but are not necessarily limited to, be CDF-based, MMR-based, CDF-and-MMR based, etc. In some embodiments, an SDR-to-EDR mapping may be applied to SDR codewords in one, two, three or more dimensions of an input color space to generate EDR codewords in one, two, three or more dimensions of an output color space.

In a first example, backward reshaping curve(s)/function(s) may be applied for mapping SDR codewords in a luma component (or channel) of an input SDR color space to EDR codewords in a luma component (or channel) of an output EDR color space.

In a second example, an MMR-based mapping may be applied for mapping SDR codewords in one or more luma and chroma components (or channels) of an input SDR color space to EDR codewords in one or more chroma components (channels) of an output EDR color space. Examples of MMR-based mappings can be found in U.S. Provisional Patent Application No. 62/404,307 as previously mentioned. Further examples of MMR-based mappings can be found in U.S. patent application Ser. No. 14/110,694, filed on Oct. 8, 2013, the entire contents of which are hereby incorporated by reference as if fully set forth herein.

For the purpose of illustration only, it has been described that composition metadata and/or DM metadata may be generated for SDR images in an input video signal as described herein to allow downstream devices to compose/predict EDR images from the SDR images and to map the EDR images to display images for target displays. It should be noted, however, that in various embodiments, images of an input dynamic range and/or an input color gamut in an input video signal may or may not be SDR images such as those specified in Rec. 709. For example, in some embodiments, hybrid-log-gamma (HLG) images of an input dynamic range (e.g., 4000 nits, 1000 nits, etc.) other than one of Rec. 709 SDR may be decoded from an input video signal as described herein. Composition metadata and/or DM metadata may be generated for the HLG images to allow downstream devices to compose/predict EDR images from the HLG images and to map the EDR images to display images for target displays.

Example Process Flows

Figure 4A:
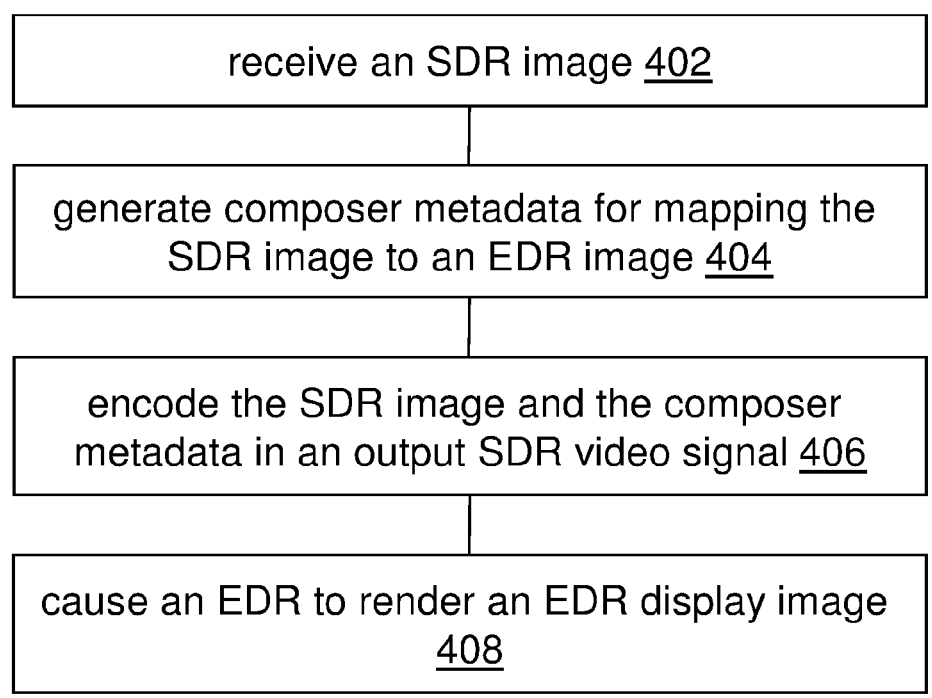
FIG. 4A through FIG. 4D illustrate example process flows.

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 402, an image processing device (e.g., coding block (120), etc.) receives a standard dynamic range (SDR) image.

In block 404, the image processing device generates composer metadata for mapping the SDR image to an enhanced dynamic range (EDR) image, the composer metadata specifying a backward reshaping mapping that is generated from a plurality of SDR-EDR image pairs in a training database, the plurality of SDR-EDR image pairs comprising a plurality of SDR images that do not include the SDR image and a plurality of EDR images that corresponds to the plurality of SDR images. In an embodiment, the backward reshaping mapping is generated from optimized prediction coefficient values obtained by training prediction coefficients with the plurality of SDR-EDR image pairs.

In block 406, the image processing device encodes the SDR image and the composer metadata in an output SDR video signal.

In block 408, the image processing device causes an EDR display operating with a receiver of the output SDR video signal to render an EDR display image, the EDR display image being derived from a composed EDR image composed from the SDR image based on the composer metadata.

In an embodiment, the SDR image is in a sequence of SDR images that are encoded in the output SDR video signal.

In an embodiment, the composer metadata specifies a backward reshaping function that is selected based on one or more of: a composition color space in which the composed EDR image is generated, a peak luminance value supported by a reference EDR display for the composed EDR image, etc.

In an embodiment, the image processing device is further configured to perform: extracting a plurality of image-related features from the SDR image; generating a set of parameters that specify the backward reshaping mapping based on the plurality of image-related features and a plurality of optimized weight values generated using the plurality of SDR-EDR image pairs; etc.

In an embodiment, plurality of optimized weight values are generated in a general linear model using the plurality of SDR-EDR image pairs.

In an embodiment, the plurality of image-related features comprises one or more of: features related to a set of luma statistical values computed from SDR luma codewords in the SDR images, features related to a distribution of the SDR luma codewords in the SDR images, features related to chroma values that corresponds to the distribution of the SDR luma codewords in the SDR images, etc.

In an embodiment, the image processing device is further configured to perform: generating a set of estimated EDR codewords for a set of SDR codewords distributed over a SDR codeword space; generating an interpolated backward reshaping mapping based on the set of estimated EDR codewords; modifying the interpolated backward reshaping mapping into the backward reshaping function that is encoded in the output SDR video signal and that satisfies a monotonically non-decreasing condition; etc.

In an embodiment, the image processing device is further configured to perform: smoothing the backward reshaping function over a moving SDR codeword window.

In an embodiment, the backward reshaping mapping represents one of: a backward reshaping curve, a backward reshaping function, a parametrized mapping function, a backward lookup table (BLUT), a set of approximating polynomial pieces, a matrix based mapping, etc.

In an embodiment, the output SDR video signal is further encoded with display management (DM) metadata to be used by the receiver for performing DM operations on the composed EDR image optimized for a reference EDR display to generate the EDR display image optimized for the EDR display.

In an embodiment, the method is performed by a video encoder; the DM metadata is generated for a DM color space by the video encoder based on approximations using composed EDR codewords in a composition color space.

In an embodiment, the DM metadata is generated for a DM color space by the video encoder based on EDR codewords generated for the DM color space.

In an embodiment, the DM metadata is generated for a DM color space by the video encoder based on mapping statistical values derived from a distribution of SDR codewords in the SDR image.

In an embodiment, the DM metadata comprises one or more of: frame-level DM metadata, scene-level DM metadata, multi-scene-level DM metadata, DM metadata generated based at least in part on manual scene cut information, DM metadata generated based at least in part on automatically detected scene cut information, filtered DM metadata generated with a sliding window, etc.

In an embodiment, at least one of the SDR image, the composed EDR image or the EDR display image is represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, a standard dynamic range (SDR) color space, etc.

The IPT-PQ color space was first introduced in PCT Application Ser. No. PCT/US2014/016304, filed on Feb. 13, 2014, for display management applications. IPT, as described in "Development and testing of a color space (ipt) with improved hue uniformity", by F. Ebner and M. D. Fairchild, in Proc. 6th Color Imaging Conference: Color Science, Systems, and Applications, IS&T, Scottsdale, Ariz., November 1998, pp. 8-13 (to be referred to as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212. PQ non-linear system reference transfer functions are also described in Rec. ITU-RBT. 2100-1 (June 2017), "Image parameter values for high dynamic range television for use in production and international programme exchange," which is incorporated herein by reference.

In an embodiment, the SDR image is of a bit depth of one of 8, 9, 10+ bits, etc.

In an embodiment, the SDR image is received in an input SDR video signal that is of a same bit depth as the output SDR video signal.

In an embodiment, the SDR image is received in an input SDR video signal that is of a different bit depth as the output SDR video signal; the output SDR video signal comprises a bit-depth scaled version of the SDR image.

In an embodiment, the SDR image is created based a video professional's artistic intent.

In an embodiment, the image processing device is further configured to perform: generating, based on a plurality of features extracted from the SDR image and a plurality of optimized prediction coefficients trained based on the plurality of SDR-EDR image pairs, a plurality of sample point mappings each of which maps an SDR sample codeword to a mapped EDR sample codeword; generating, based on the plurality of sample point mappings, an interpolated backward reshaping mapping over an entire range of available SDR codewords; generating the backward reshaping mapping from the interpolated backward reshaping mapping by applying average filtering to the interpolated backward reshaping mapping using a sliding window around each available SDR codeword in the entire range of available SDR codewords.

In an embodiment, the filtered DM metadata includes an average scene-based luminance value smoothed by a smoothing filter based on the sliding window; the sliding window moves across scene cuts as indicated in the automatically detected scene cut information.

Figure 4B:
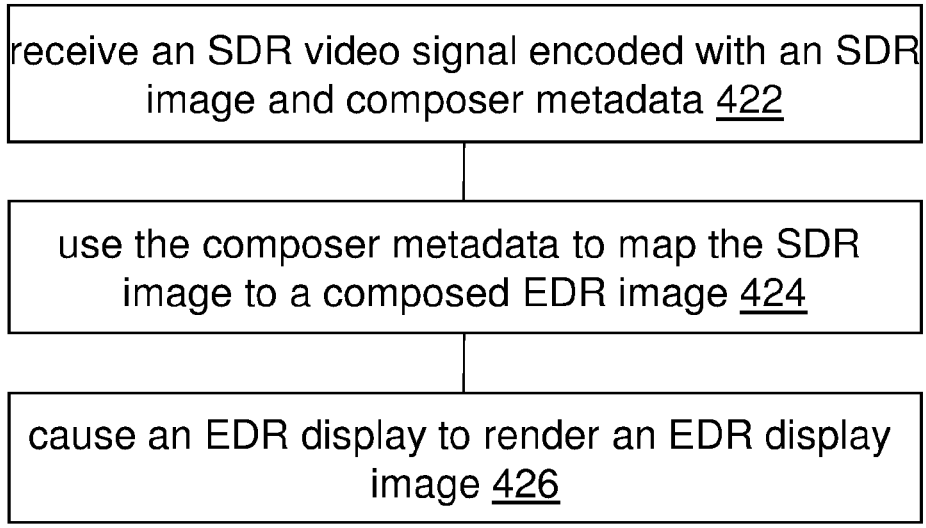

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 422, an image processing device (e.g., coding block (120), etc.) receives a standard dynamic range (SDR) video signal that is encoded with an SDR image and composer metadata.

In block 424, the image processing device uses the composer metadata to map the SDR image to a composed enhanced dynamic range (EDR) image, the composer metadata specifying a backward reshaping mapping that is generated by a video encoder from a plurality of SDR-EDR image pairs in a training database, the plurality of SDR-EDR image pairs comprising a plurality of SDR images that do not include the SDR image and a plurality of EDR images that corresponds to the plurality of SDR images.

In block 426, the image processing device causes an EDR display operating with a receiver of the SDR video signal to render an EDR display image, the EDR display image being derived from the composed EDR image composed from the SDR image based on the composer metadata.

In an embodiment, the composer metadata is carried in the SDR video signal as image metadata separate from the SDR image.

In an embodiment, the image processing device is further configured to perform color space conversion on the composed EDR image.

In an embodiment, the image processing device is further configured to perform: extracting display management (DM) metadata from the SDR video signal; applying DM operations on the composed EDR image as a part of generating the EDR display image from the composed EDR image; etc.

Figure 4C:
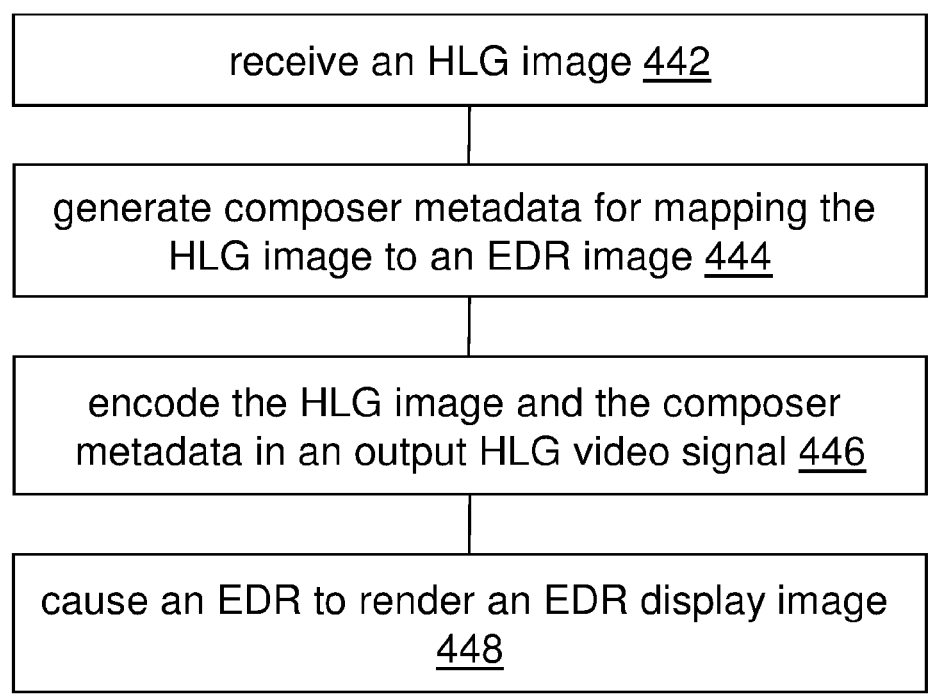

FIG. 4C illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 442, an image processing device (e.g., coding block (120), etc.) receives a hybrid-log-gamma (HLG) image.

In block 444, the image processing device generates composer metadata for mapping the HLG image to an enhanced dynamic range (EDR) image, the composer metadata specifying a backward reshaping mapping that is generated from a plurality of HLG-EDR image pairs in a training database, the plurality of HLG-EDR image pairs comprising a plurality of HLG images that do not include the HLG image and a plurality of EDR images that corresponds to the plurality of HLG images. In an embodiment, the backward reshaping mapping is generated from optimized prediction coefficient values obtained by training prediction coefficients with the plurality of HLG-EDR image pairs.

In block 446, the image processing device encodes the HLG image and the composer metadata in an output HLG video signal.

In block 448, the image processing device causes an EDR display operating with a receiver of the output HLG video signal to render an EDR display image, the EDR display image being derived from a composed EDR image composed from the HLG image based on the composer metadata.

In an embodiment, the image processing device is further configured to perform: generating, based on a plurality of features extracted from the HLG image and a plurality of optimized prediction coefficients trained based on the plurality of HLG-EDR image pairs, a plurality of sample point mappings each of which maps an HLG sample codeword to a mapped EDR sample codeword; generating, based on the plurality of sample point mappings, an interpolated backward reshaping mapping over an entire range of available HLG codewords; generating the backward reshaping mapping from the interpolated backward reshaping mapping by applying average filtering to the interpolated backward reshaping mapping using a sliding window around each available HLG codeword in the entire range of available HLG codewords; etc.

Figure 4D:
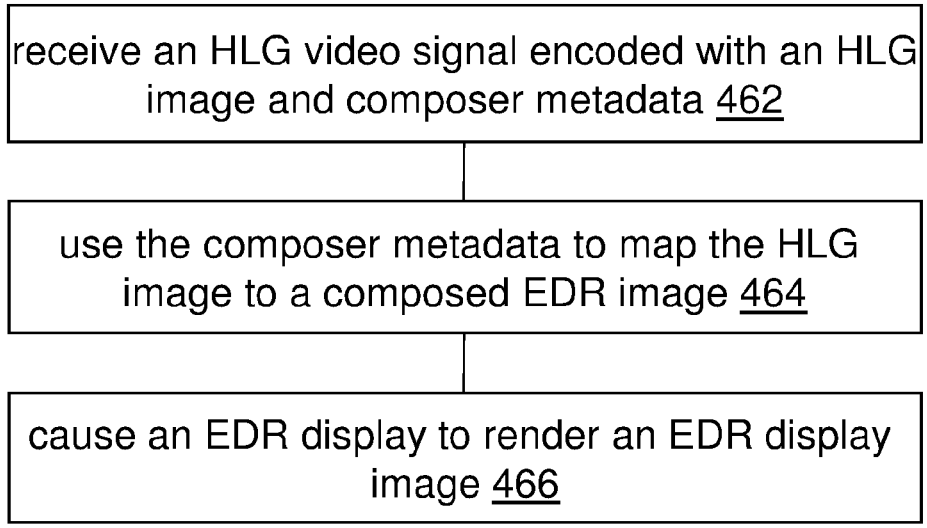

FIG. 4D illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 462, an image processing device (e.g., coding block (120), etc.) receives a hybrid-log-gamma (HLG) video signal that is encoded with an HLG image and composer metadata.

In block 464, the image processing device uses the composer metadata to map the HLG image to a composed enhanced dynamic range (EDR) image, the composer metadata specifying a backward reshaping mapping that is generated by a video encoder from a plurality of HLG-EDR image pairs in a training database, the plurality of HLG-EDR image pairs comprising a plurality of HLG images that do not include the HLG image and a plurality of EDR images that corresponds to the plurality of HLG images.

In block 466, the image processing device causes an EDR display operating with a receiver of the HLG video signal to render an EDR display image, the EDR display image being derived from the composed EDR image composed from the HLG image based on the composer metadata.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
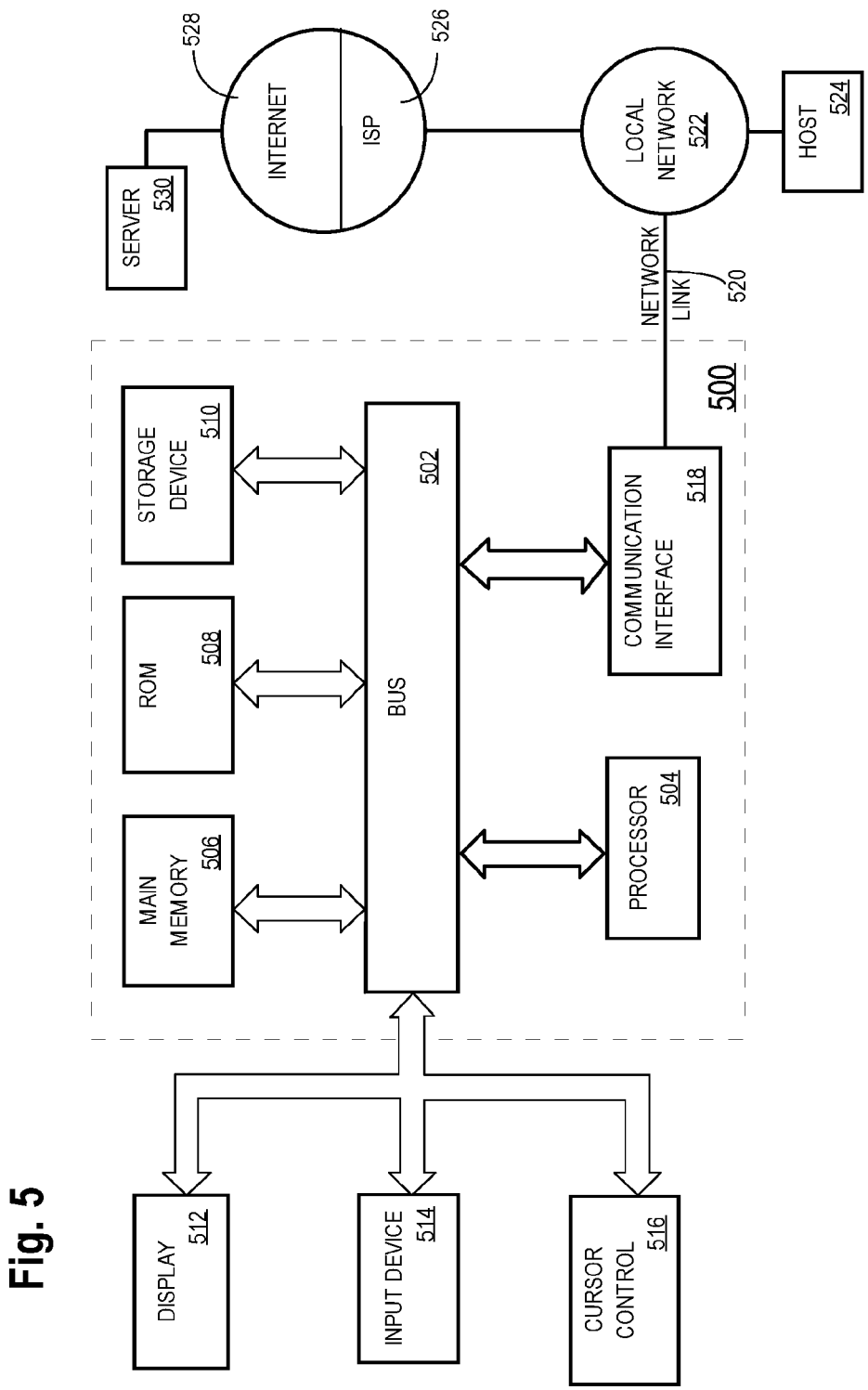
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE1. A method comprising:
  receiving a standard dynamic range (SDR) image;
  generating composer metadata for mapping the SDR image to an enhanced dynamic range (EDR) image, the composer metadata specifying a backward reshaping mapping that is generated from a plurality of SDR-EDR image pairs in a training database, the plurality of SDR-EDR image pairs comprising a plurality of SDR images that do not include the SDR image and a plurality of EDR images that corresponds to the plurality of SDR images;
  encoding the SDR image and the composer metadata in an output SDR video signal;
  causing an EDR display operating with a receiver of the output SDR video signal to render an EDR display image, the EDR display image being derived from a composed EDR image composed from the SDR image based on the composer metadata.

EEE2. The method of EEE 1, wherein the SDR image is in a sequence of SDR images that are encoded in the output SDR video signal.

EEE3. The method of any preceding EEE, wherein the composer metadata specifies a backward reshaping function that is selected based on one or more of: a composition color space in which the composed EDR image is generated, or a peak luminance value supported by a reference EDR display for the composed EDR image.

EEE4. The method of any preceding EEE, further comprising:
  extracting a plurality of image-related features from the SDR image;
  generating a set of parameters that specify the backward reshaping mapping based on the plurality of image-related features and a plurality of optimized weight values generated using the plurality of SDR-EDR image pairs.

EEE5. The method of any preceding EEE, wherein plurality of optimized weight values are generated in a general linear model using the plurality of SDR-EDR image pairs.

EEE6. The method of any preceding EEE, wherein the plurality of image-related features comprises one or more of: features related to a set of luma statistical values computed from SDR luma codewords in the SDR images, features related to a distribution of the SDR luma codewords in the SDR images, or features related to chroma values that corresponds to the distribution of the SDR luma codewords in the SDR images.

EEE7. The method of EEE 4, further comprising:
  generating a set of estimated EDR codewords for a set of SDR codewords distributed over a SDR codeword space;
  generating an interpolated backward reshaping mapping based on the set of estimated EDR codewords;
  modifying the interpolated backward reshaping mapping into the backward reshaping function that is encoded in the output SDR video signal, wherein the backward reshaping function satisfies a monotonically non-decreasing condition.

EEE8. The method of EEE 7, further comprising:
  smoothing the backward reshaping function over a moving SDR codeword window.

EEE9. The method of any preceding EEE, wherein the backward reshaping mapping represents one of: a backward reshaping curve, a backward reshaping function, a parametrized mapping function, a backward lookup table (BLUT), a set of approximating polynomial pieces, or a matrix based mapping.

EEE10. The method of any preceding EEE, wherein the output SDR video signal is further encoded with display management (DM) metadata to be used by the receiver for performing DM operations on the composed EDR image optimized for a reference EDR display to generate the EDR display image optimized for the EDR display.

EEE11. The method of EEE 10, wherein the method is performed by a video encoder, and wherein the DM metadata is generated for a DM color space by the video encoder based on approximations using composed EDR codewords in a composition color space.

EEE12. The method of EEE 10, wherein the method is performed by a video encoder, and wherein the DM metadata is generated for a DM color space by the video encoder based on EDR codewords generated for the DM color space.

EEE13. The method of EEE 10, wherein the method is performed by a video encoder, and wherein the DM metadata is generated for a DM color space by the video encoder based on mapping statistical values derived from a distribution of SDR codewords in the SDR image.

EEE14. The method of any one of EEEs 10 to 13, wherein the DM metadata comprises one or more of: frame-level DM metadata, scene-level DM metadata, multi-scene-level DM metadata, DM metadata generated based at least in part on manual scene cut information, DM metadata generated based at least in part on automatically detected scene cut information, or filtered DM metadata generated with a sliding window.

EEE15. The method of EEE 14, wherein the filtered DM metadata includes an average scene-based luminance value smoothed by a smoothing filter based on the sliding window, and wherein the sliding window moves across scene cuts as indicated in the automatically detected scene cut information.

EEE16. The method of any preceding EEE, wherein at least one of the SDR image, the composed EDR image or the EDR display image is represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

EEE17. The method of any preceding EEE, wherein the SDR image is of a bit depth of one of 8, 9 or 10+ bits.

EEE18. The method of any preceding EEE, wherein the SDR image is received in an input SDR video signal that is of a same bit depth as the output SDR video signal.

EEE19. The method of any preceding EEE, wherein the SDR image is received in an input SDR video signal that is of a different bit depth as the output SDR video signal, and wherein the output SDR video signal comprises a bit-depth scaled version of the SDR image.

EEE20. The method of any preceding EEE, wherein the SDR image is created based a video professional's artistic intent.

EEE21. The method of any preceding EEE, wherein the backward reshaping mapping is generated from optimized prediction coefficient values obtained by training prediction coefficients with the plurality of SDR-EDR image pairs.

EEE22. The method of any preceding EEE, further comprising:
generating, based on a plurality of features extracted from the SDR image and a plurality of optimized prediction coefficients trained based on the plurality of SDR-EDR image pairs, a plurality of sample point mappings each of which maps an SDR sample codeword to a mapped EDR sample codeword;
generating, based on the plurality of sample point mappings, an interpolated backward reshaping mapping over an entire range of available SDR codewords;
generating the backward reshaping mapping from the interpolated backward reshaping mapping by applying average filtering to the interpolated backward reshaping mapping using a sliding window around each available SDR codeword in the entire range of available SDR codewords.

EEE23. A method comprising:
receiving a standard dynamic range (SDR) video signal that is encoded with an SDR image and composer metadata;
using the composer metadata to map the SDR image to a composed enhanced dynamic range (EDR) image, the composer metadata specifying a backward reshaping mapping that is generated by a video encoder from a plurality of SDR-EDR image pairs in a training database, the plurality of SDR-EDR image pairs comprising a plurality of SDR images that do not include the SDR image and a plurality of EDR images that corresponds to the plurality of SDR images;
causing an EDR display operating with a receiver of the SDR video signal to render an EDR display image, the EDR display image being derived from the composed EDR image composed from the SDR image based on the composer metadata.

EEE24. The method of EEE 23, wherein the composer metadata is carried in the SDR video signal as image metadata separate from the SDR image.

EEE25. The method of EEE 23 or EEE 24, further comprising performing color space conversion on the composed EDR image.

EEE26. The method of any one of EEEs 23 to 25, further comprising:
extracting display management (DM) metadata from the SDR video signal;
applying DM operations on the composed EDR image as a part of generating the EDR display image from the composed EDR image.

EEE27. A method comprising:
receiving a hybrid-log-gamma (HLG) image;
generating composer metadata for mapping the HLG image to an enhanced dynamic range (EDR) image, the composer metadata specifying a backward reshaping mapping that is generated from a plurality of HLG-EDR image pairs in a training database, the plurality of HLG-EDR image pairs comprising a plurality of HLG images that do not include the HLG image and a plurality of EDR images that corresponds to the plurality of HLG images;
encoding the HLG image and the composer metadata in an output HLG video signal;
causing an EDR display operating with a receiver of the output HLG video signal to render an EDR display image, the EDR display image being derived from a composed EDR image composed from the HLG image based on the composer metadata.

EEE28. The method of EEE 27, further comprising:
generating, based on a plurality of features extracted from the HLG image and a plurality of optimized prediction coefficients trained based on the plurality of HLG-EDR image pairs, a plurality of sample point mappings each of which maps an HLG sample codeword to a mapped EDR sample codeword;
generating, based on the plurality of sample point mappings, an interpolated backward reshaping mapping over an entire range of available HLG codewords;
generating the backward reshaping mapping from the interpolated backward reshaping mapping by applying average filtering to the interpolated backward reshaping mapping using a sliding window around each available HLG codeword in the entire range of available HLG codewords.

EEE29. A method comprising:
receiving a hybrid-log-gamma (HLG) video signal that is encoded with an HLG image and composer metadata;
using the composer metadata to map the HLG image to a composed enhanced dynamic range (EDR) image, the composer metadata specifying a backward reshaping mapping that is generated by a video encoder from a plurality of HLG-EDR image pairs in a training database, the plurality of HLG-EDR image pairs comprising a plurality of HLG images that do not include the HLG image and a plurality of EDR images that corresponds to the plurality of HLG images;
causing an EDR display operating with a receiver of the HLG video signal to render an EDR display image, the EDR display image being derived from the composed EDR image composed from the HLG image based on the composer metadata.

EEE30. A computer system configured to perform any one of the methods recited in EEEs 1-29.

EEE31. An apparatus comprising a processor and configured to perform any one of the methods recited in EEEs 1-29.

EEE32. A non-transitory computer-readable storage medium having stored thereon computer-executable instruction for executing a method in accordance with any of the EEEs 1-29.

The invention claimed is:
1. A method comprising:
receiving a standard dynamic range (SDR) image;
generating composer metadata for mapping the SDR image to an enhanced dynamic range (EDR) image, the composer metadata specifying a backward reshaping mapping that is generated from a plurality of SDR-EDR image pairs in a training database, the plurality of SDR-EDR image pairs comprising a plurality of SDR images that do not include the SDR image and a plurality of EDR images that corresponds to the plurality of SDR images;
encoding the SDR image and the composer metadata in an output SDR video signal; and
outputting the SDR video signal such as to enable an EDR display operating with a receiver of the output SDR video signal to render an EDR display image, the EDR display image being derived from a composed EDR image composed from the SDR image based on the composer metadata, wherein the method further comprises:

extracting a plurality of image-related features from the SDR image; and generating a set of parameters that specify the backward reshaping mapping based on the plurality of image-related features and a plurality of prediction coefficient values generated using the plurality of SDR-EDR image pairs.

2. The method of claim 1, wherein the backward reshaping mapping represents a backward reshaping function that is selected based on one or more of: a composition color space in which the composed EDR image is generated, or a peak luminance value supported by a reference EDR display for the composed EDR image.

3. The method of claim 1, wherein the backward reshaping mapping represents one of: a backward reshaping curve, a backward reshaping function, a parametrized mapping function, a backward lookup table (BLUT), a set of approximating polynomial pieces, or a matrix based mapping.

4. The method of claim 1, wherein the output SDR video signal is further encoded with display management (DM) metadata to be used by the receiver for performing DM operations on the composed EDR image optimized for a reference EDR display to generate the EDR display image optimized for the EDR display.

5. The method of claim 1, wherein at least one of the SDR image, the composed EDR image or the EDR display image is represented in one of: an IPT PQ color space, an YCbCr color space, an RGB color space, a Rec. 2020 color space, a Rec. 709 color space, an extended dynamic range (EDR) color space, a HLG color space, or a standard dynamic range (SDR) color space.

6. The method of claim 1, wherein the backward reshaping mapping is generated from prediction coefficient values obtained by training prediction coefficients with the plurality of SDR-EDR image pairs.

7. The method of claim 1, further comprising:

generating, based on a plurality of image-related features extracted from the SDR image and a plurality of prediction coefficients trained based on the plurality of SDR-EDR image pairs, a plurality of sample point mappings each of which maps an SDR sample value to a mapped EDR sample value;

generating, based on the plurality of sample point mappings, an interpolated backward reshaping mapping over an entire range of available SDR values;

generating the backward reshaping mapping from the interpolated backward reshaping mapping by applying average filtering to the interpolated backward reshaping mapping using a sliding window around each available SDR value in the entire range of available SDR values.

8. A method comprising:

receiving a standard dynamic range (SDR) video signal that is encoded with an SDR image and composer metadata;

using the composer metadata to map the SDR image to a composed enhanced dynamic range (EDR) image, the composer metadata specifying a backward reshaping mapping that is generated by a video encoder from a plurality of SDR-EDR image pairs in a training database, the plurality of SDR-EDR image pairs comprising a plurality of SDR images that do not include the SDR image and a plurality of EDR images that corresponds to the plurality of SDR images;

causing an EDR display operating with a receiver of the SDR video signal to render an EDR display image, the EDR display image being derived from the composed EDR image composed from the SDR image based on the composer metadata, wherein the backward reshaping mapping is specified by a set of parameters that are generated based on a plurality of image-related features extracted from the SDR image and a plurality of prediction coefficient values generated using the plurality of SDR-EDR image pairs.

9. The method of claim 8, wherein the composer metadata is carried in the SDR video signal as image metadata separate from the SDR image.

10. The method of claim 8, further comprising performing color space conversion on the composed EDR image.

11. The method of claim 8, further comprising:

extracting display management (DM) metadata from the SDR video signal;

applying DM operations on the composed EDR image as a part of generating the EDR display image from the composed EDR image.

* * * * *